(12) United States Patent
Kim et al.

(10) Patent No.: US 10,658,880 B2
(45) Date of Patent: May 19, 2020

(54) ELECTRONIC DEVICE FOR OPERATING POWERLESS SENSOR AND CONTROL METHOD THEREOF

(71) Applicant: Samsung Electronics Co., Ltd., Suwon-si, Gyeonggi-do (KR)

(72) Inventors: Dong-Zo Kim, Yongin-si (KR); Sang-Wook Kwon, Seongnam-si (KR); Ki-Young Kim, Yongin-si (KR); Sung-Bum Park, Suwon-si (KR); Byoung-Hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 15/060,873

(22) Filed: Mar. 4, 2016

(65) Prior Publication Data
US 2016/0261151 A1    Sep. 8, 2016

(30) Foreign Application Priority Data

Mar. 6, 2015 (KR) .................... 10-2015-0031695
Feb. 15, 2016 (KR) .................... 10-2016-0017217

(51) Int. Cl.
*H02J 50/80* (2016.01)
*H02J 7/02* (2016.01)

(52) U.S. Cl.
CPC .............. *H02J 50/80* (2016.02); *H02J 7/025* (2013.01)

(58) Field of Classification Search
CPC .................................. H02J 50/80; H02J 7/025
See application file for complete search history.

(56) References Cited

U.S. PATENT DOCUMENTS

| 7,412,898 | B1* | 8/2008 | Smith | G01L 5/24 73/761 |
|---|---|---|---|---|
| 8,441,364 | B2 | 5/2013 | Azancot et al. | |
| 9,026,165 | B2* | 5/2015 | Kim | H04W 52/34 455/522 |
| 2009/0146608 | A1 | 6/2009 | Lee | |
| 2010/0264746 | A1* | 10/2010 | Kazama | H02J 50/80 307/104 |
| 2012/0150259 | A1 | 6/2012 | Meskens | |
| 2012/0268238 | A1* | 10/2012 | Park | G07F 15/006 340/5.8 |

(Continued)

FOREIGN PATENT DOCUMENTS

| CN | 102760332 A | 10/2012 |
|---|---|---|
| CN | 203218926 U * | 9/2013 |

(Continued)

OTHER PUBLICATIONS

Chinese Office Action dated Sep. 19, 2019, issued in Chinese Patent Application No. 201680013904.5.

(Continued)

*Primary Examiner* — Pinping Sun
(74) *Attorney, Agent, or Firm* — Jefferson IP Law, LLP

(57) ABSTRACT

An electronic device performing communication with a powerless sensor is provided. The electronic device includes a wireless charging module configured to wirelessly transmit power to a powerless sensor; and a communication module configured to receive data that is sensed in the powerless sensor using the wirelessly transmitted power.

20 Claims, 26 Drawing Sheets

(56) References Cited

U.S. PATENT DOCUMENTS

| | | | |
|---|---|---|---|
| 2012/0329405 A1* | 12/2012 | Lee | H02J 7/025 455/73 |
| 2014/0152251 A1 | 6/2014 | Kim et al. | |
| 2014/0180630 A1 | 6/2014 | Cheatham, III et al. | |
| 2014/0191712 A1* | 7/2014 | Rea | H02J 5/005 320/108 |
| 2014/0266019 A1 | 9/2014 | Pigott | |
| 2015/0078461 A1* | 3/2015 | Lee | H04B 5/0031 375/256 |
| 2015/0364844 A1* | 12/2015 | Shih | H01R 12/72 439/145 |
| 2016/0181849 A1* | 6/2016 | Govindaraj | H02J 7/025 320/108 |
| 2016/0204622 A1* | 7/2016 | Leabman | H02J 50/80 307/104 |
| 2016/0336804 A1* | 11/2016 | Son | H02J 7/0027 |

FOREIGN PATENT DOCUMENTS

| | | |
|---|---|---|
| CN | 104052166 A | 9/2014 |
| KR | 10-2012-0065540 A | 6/2012 |
| KR | 10-2012-0128916 A | 11/2012 |
| KR | 10-2014-0067355 A | 6/2014 |
| KR | 10-2014-0072232 A | 6/2014 |
| KR | 10-2014-0124455 A | 10/2014 |
| WO | 2014081071 A1 | 5/2014 |
| WO | 2014081072 A1 | 5/2014 |

OTHER PUBLICATIONS

Indian Office Action dated Mar. 20, 2020, issue in Indian Patent Application No. 201717028307.

* cited by examiner

ELECTRONIC DEVICE FOR OPERATING POWERLESS SENSOR AND CONTROL METHOD THEREOF

CROSS-REFERENCE TO RELATED APPLICATION(S)

This application claims the benefit under 35 U.S.C. § 119(a) of a Korean patent application filed in the Korean Intellectual Property Office on Mar. 6, 2015 and assigned Serial number 10-2015-0031695, and of a Korean patent application filed in the Korean Intellectual Property Office on Feb. 15, 2016 and assigned Serial No. 10-2016-0017217, the entire disclosure of each of which is hereby incorporated by reference.

TECHNICAL FIELD

The present disclosure relates to an electronic device for operating a powerless sensor and a control method thereof. More particularly, the present disclosure relates to an electronic device for operating a sensor through wireless power charging and a control method thereof.

BACKGROUND

Recently, the development of technologies related to internet of things (IoT) has been actively conducted. IoT refers to the technology that enables the Internet connectivity by assigning a unique internet protocol (IP) address to a device and performing communication using the assigned IP address.

With the development of IoT, it is possible to provide the services that further meet the user's conveniences. For example, an electronic device implementing IoT may receive sensing data from various sensors according to the related art. The electronic device may infer the environment or user related information using the sensing data received from the sensors. For example, the electronic device may infer that the user has entered a specific place based on the sensing data from a proximity sensor. In response, the electronic device may operate (i.e., activate) lights in the specific place. Accordingly, as the user enters a specific location, it is possible to control the lightings, thereby maximizing the user's conveniences.

One problem is related to the operation power. For example, low-power electronic devices such as sensors should continuously turn on a communication module to perform communication. Accordingly, the consumption of the operation power is relatively high. Particularly, when the sensor is implanted in the user's body, the operation power should be supplied to the sensor with an internal battery, making the above problem more serious.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for operating a powerless sensor and a control method thereof.

In accordance with an aspect of the present disclosure, an electronic device is provided. The electronic device includes a wireless charging module configured to wirelessly transmit power to a powerless sensor, and a communication module configured to receive data that is sensed in the powerless sensor using the wirelessly transmitted power.

In accordance with another aspect of the present disclosure, a control method of an electronic device is provided. The control method includes wirelessly transmitting power to a powerless sensor, and receiving data that is sensed in the powerless sensor using the wirelessly transmitted power.

In accordance with another aspect of the present disclosure, a control method of an electronic device for controlling a powerless electronic device is provided. The control method includes obtaining a control command for the powerless electronic device, wirelessly transmitting power for operation to the powerless electronic device, and transmitting a control signal corresponding to the control command to the powerless electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
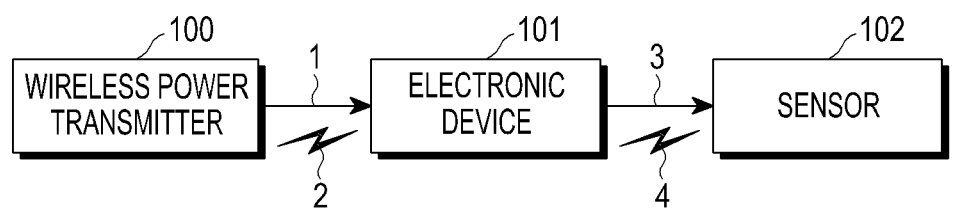
FIG. 1A is a block diagram of a wireless system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor) that can perform a corresponding operation by executing at least one software program stored at an exclusive processor (such as an embedded processor) for performing a corresponding operation or at a memory device.

Terms defined in the present disclosure are used for only describing a specific embodiment and may not have an intention to limit the scope of other various embodiments. When using in a description of the present disclosure, a singular form may include a plurality of forms unless it is explicitly represented. Entire terms including a technical term and a scientific term used may have the same meaning as a meaning that may be generally understood by a person of common skill in the art. Terms used herein have the same meaning as or a meaning similar to that of a context of related technology and are not analyzed as an ideal or excessively formal meaning unless explicitly defined. In some case, terms defined in the present disclosure cannot be analyzed to exclude the present embodiments.

An electronic device according to various embodiments of the present disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, or a wearable device. In various embodiments of the present disclosure, the wearable device may include at least one of an accessory-type wearable device (e.g., watches, rings, bracelets, anklets, necklaces, glasses, contact lenses or head-mounted-devices (HMD)), a textile/clothing-integrated wearable device (e.g., electronic clothing), a body-mounted wearable device (e.g., skin pads or tattoo), or a bio-implantable wearable device (e.g., implantable circuits).

In various embodiments of the present disclosure, the electronic device may be a home appliance. The home appliance may include at least one of, for example, a television (TV), a digital versatile disc (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment of the present disclosure, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller's machine (ATM) for banks, point of sales (POS) for shops, or an internet of things (IoT) device (e.g., an electronic bulb, various sensors, an electricity or gas meter, a sprinkler device, a fire alarm, a thermostat, a streetlamp, a toaster, fitness equipment, a hot-water tank, a heater, a boiler or the like).

In various embodiments of the present disclosure, the electronic device may include at least one of a part of the furniture or building/structure, an electronic board, an electronic signature receiving device, a projector, or various meters (e.g., meters for water, electricity, gas or radio waves). In various embodiments of the present disclosure, the electronic device may be one or a combination of the above-described devices. An electronic device according to some embodiments may be a flexible electronic device. An electronic device according to an embodiment of the present disclosure will not be limited to the above-described devices, and may include a new electronic device that is provided by the development of technology.

Now, an electronic device according to various embodiments of the present disclosure will be described with reference to the accompanying drawings. As used herein, the term 'user' may refer to a person who uses the electronic device, or a device (e.g., an intelligent electronic device) that uses the electronic device.

FIG. 1A is a block diagram of a wireless system according to various embodiments of the present disclosure.

Referring to FIG. 1, a wireless power transmitter 100 may wirelessly transmit power 1 to an electronic device 101. In an embodiment of the present disclosure, the wireless power transmitter 100 may wirelessly transmit the power 1 to an authenticated electronic device that has undergone a predetermined authentication procedure.

The wireless power transmitter 100 may form an electrical connection to the electronic device 101. For example, the wireless power transmitter 100 may transmit wireless power in the form of an electromagnetic wave to the electronic device 101.

The wireless power transmitter 100 may perform bi-directional communication with the electronic device 101. The wireless power transmitter 100 and the electronic device 101 may process or transmit/receive a packet 2 that is configured in a predetermined frame. The electronic device 101 may be implemented as, for example, a mobile communication terminal, a PDA, a PMP, and a smartphone.

The wireless power transmitter 100 may wirelessly provide power to the electronic device 101. For example, the wireless power transmitter 100 may transmit the power to the electronic device 101 through a resonance scheme or an induction scheme. When the wireless power transmitter 100 adopts the resonance scheme, the distance between the wireless power transmitter 100 and the electronic device 101 may generally be less than or equal to 30 m. When the wireless power transmitter 100 adopts the electromagnetic induction scheme, the distance between the wireless power transmitter 100 and the electronic device 101 may generally be less than or equal to 10 cm.

The electronic device 101 may recharge a battery by receiving wireless power from the wireless power transmitter 100. The electronic device 101 may transmit, to the wireless power transmitter 100, a signal for requesting transmission of wireless power, information required for reception of wireless power, status information of the electronic device 101, or control information for the wireless power transmitter 100. The electronic device 101 may transmit a message indicating its charging status to the wireless power transmitter 100.

The wireless power transmitter 100 may include a display to output (or indicate) the status of the electronic device 101 based on the message received from the electronic device 101. In addition, the wireless power transmitter 100 may display the time that is expected until the electronic device 101 is fully charged.

The wireless power transmitter 100 may transmit a control signal for disabling the wireless charging function to the electronic device 101. Upon receiving the control signal for disabling the wireless charging function from the wireless power transmitter 100, the electronic device 101 may disable the wireless charging function.

As described above, the electronic device 101 may store the power received from the wireless power transmitter 100. The electronic device 101 may transmit the wireless power 3 to a sensor 102. As will be described in more detail below, the electronic device 101 may include both of a wireless power transmission module and a wireless power reception module. Accordingly, the electronic device 101 may transmit the wireless power 3 to the sensor 102.

The sensor 102 may perform sensing using the received power. The sensor 102 may transmit sensing data 4 to the electronic device 101 using the received power. The electronic device 101 may receive and process the sensing data 4, and operate using the sensing data 4. In various embodiments of the present disclosure, the sensor 102 may include a wireless power reception module, and may not include a wired/wireless interface for separate power provision. Accordingly, the sensor 102 may be implanted in a living body or a structure, and may be wirelessly charged without battery replacement.

Figure 1B:
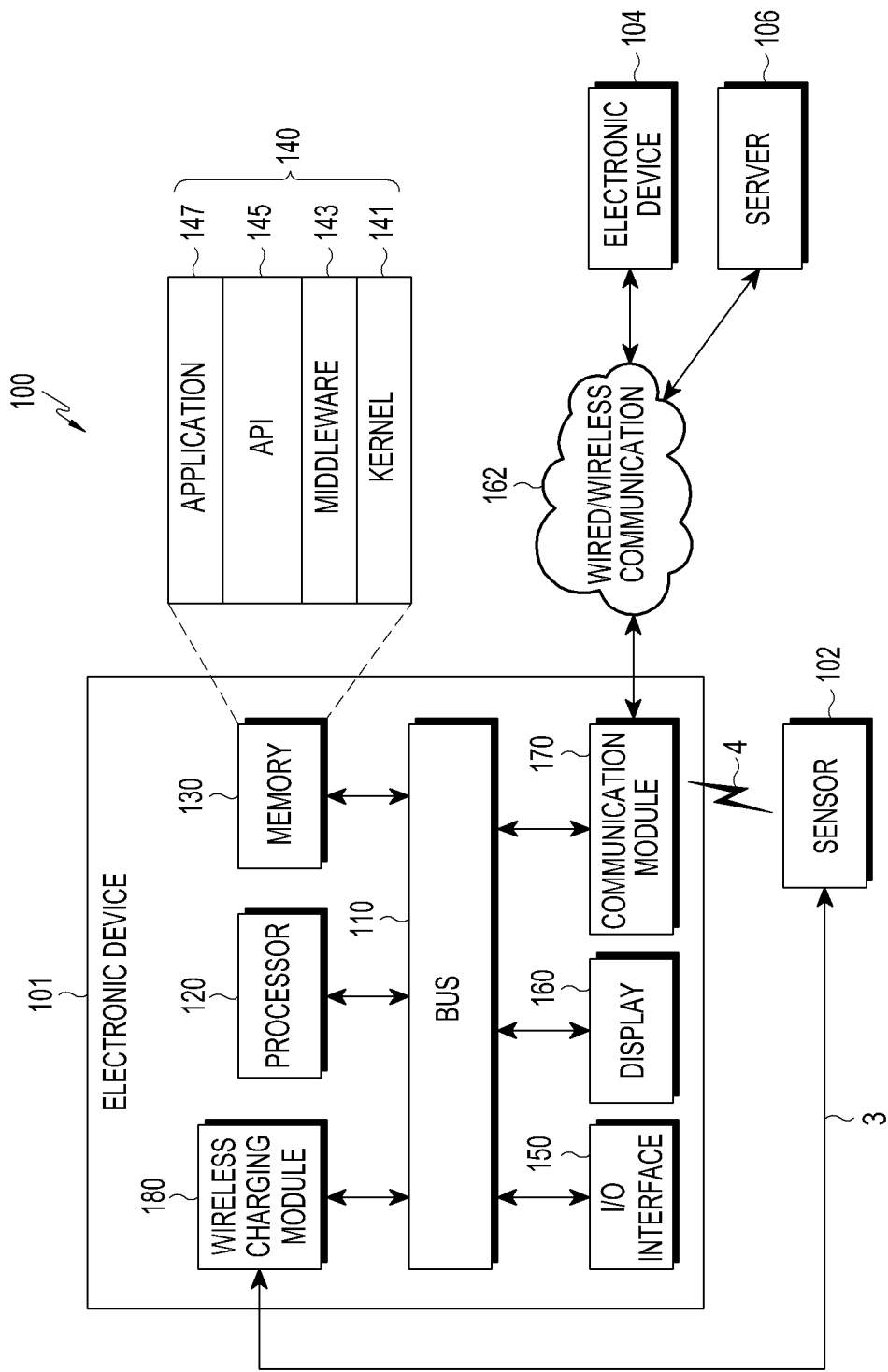
FIG. 1B illustrates a network environment including an electronic device according to various embodiments of the present disclosure.

FIG. 1B illustrates a network environment including an electronic device according to various embodiments of the present disclosure.

Referring to FIG. 1B, an electronic device 101 in a network environment 100 in various embodiments will be described. The electronic device 101 may include a bus 110, a processor 120, a memory 130, an input/output (I/O) interface 150, a display 160 and a communication module 170. In certain embodiments of the present disclosure, the electronic device 101 may omit at least one of the components, or may additionally include other components.

The bus 110 may include, for example, a circuit that connects the components 110 to 170 to each other, and transfers the communication (e.g., a control message and/or data) between the components 110 to 170.

The processor 120 may include one or more of a CPU, an application processor (AP) or a communication processor (CP). The processor 120 may perform a communication-related operation or data processing operation for at least one other component of the electronic device 101.

The memory 130 may include a volatile and/or non-volatile memory. The memory 130 may store, for example, a command or data related to at least one other component of the electronic device 101. In an embodiment of the present disclosure, the memory 130 may store software and/or a program 140. The program 140 may include, for example, a kernel 141, a middleware 143, an application programming interface (API) 145, and/or an application program (or application) 147. At least some of the kernel 141, the middleware 143 or the API 145 may be referred to as an operating system (OS).

The kernel 141 may, for example, control or manage the system resources (e.g., the bus 110, the processor 120, or the memory 130) that are used to execute the operation or function implemented in other programs (e.g., the middleware 143, the API 145, or the application program 147). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141. Further, the middleware 143 may schedule one or more work requests received from the application program 147. For example, the middleware 143 may give, to one of the application program (s) 147, a priority to use the system resources (e.g., the bus 110, the processor 120, or the memory 130) of the electronic device 101. For example, the middleware 143 may handle the one or more work requests in the order of the priority given to at least one application, making it possible to perform scheduling or load balancing for the one or more work requests.

The API 145 is, for example, an interface by which the application 147 controls the function provided in the kernel 141 or the middleware 143, and may include at least one interface or function (e.g., a command) for, for example, file control, window control, image processing or character control.

The I/O interface 150 may, for example, serve as an interface that can transfer a command or data received from the user or other external device to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body.

The communication module 170 may, for example, establish communication 4 between the electronic device 101 and an external device (e.g., a sensor 102, an external electronic device 104 or a server 106). For example, the communication module 170 may communicate with the external device (e.g., the external electronic device 104 or the server 106) by being connected to a network 162 by wireless communication or wired communication.

The wireless communication may include at least one of, for example, long term evolution (LTE), LTE-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. Further, the wireless communication may include, for example, short-range communication. The short-range communication may include at least one of, for example, wireless fidelity (Wi-Fi), Bluetooth (BT), near field communication (NFC) or global navigation satellite system (GNSS). GNSS may include at least one of, for example, global positioning system (GPS), global navigation satellite system (Glonass), Beidou navigation satellite system (Beidou) or Galileo, and the European global satellite-based navigation system, depending on the area of use or the bandwidth. In the present disclosure, the term 'GPS' may be interchangeably used with the term 'GNSS'. The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet or the telephone network.

Each of the sensor 102 or the external electronic device 104 may be a device that is the same as or different from the electronic device 101. In an embodiment of the present disclosure, the server 106 may include a group of one or more servers. In various embodiments of the present disclosure, all or some of the operations executed in the electronic device 101 may be executed in one or multiple other electronic devices (e.g., the sensor 102, the external electronic device 104 or the server 106). In an embodiment of the present disclosure, if the electronic device 101 should perform a certain function or service automatically or upon request, the electronic device 101 may request at least some of the functions related thereto from other electronic devices (e.g., the sensor 102, the electronic device 104, or the server 106), instead of or in addition to executing the function or service. The other electronic devices (e.g., the sensor 102, the electronic device 104, or the server 106) may execute the requested function or additional function, and deliver the results to the electronic device 101. The electronic device 101 may process the received results intact or additionally, thereby providing the requested function or service. To this end, for example, the cloud computing, distributed computing, or client-server computing technology may be used.

A wireless charging module 180 may transmit wireless power 3 to the sensor 102. The wireless charging module 180 may transmit the wireless power 3 to the sensor 102 based on the induction scheme or the resonance scheme. The wireless charging module 180 may include a wireless power transmission module for transmission of wireless power. The wireless charging module 180 may include a wireless power reception module capable of receiving wireless power from a wireless power transmitter (not shown).

Figure 2A:
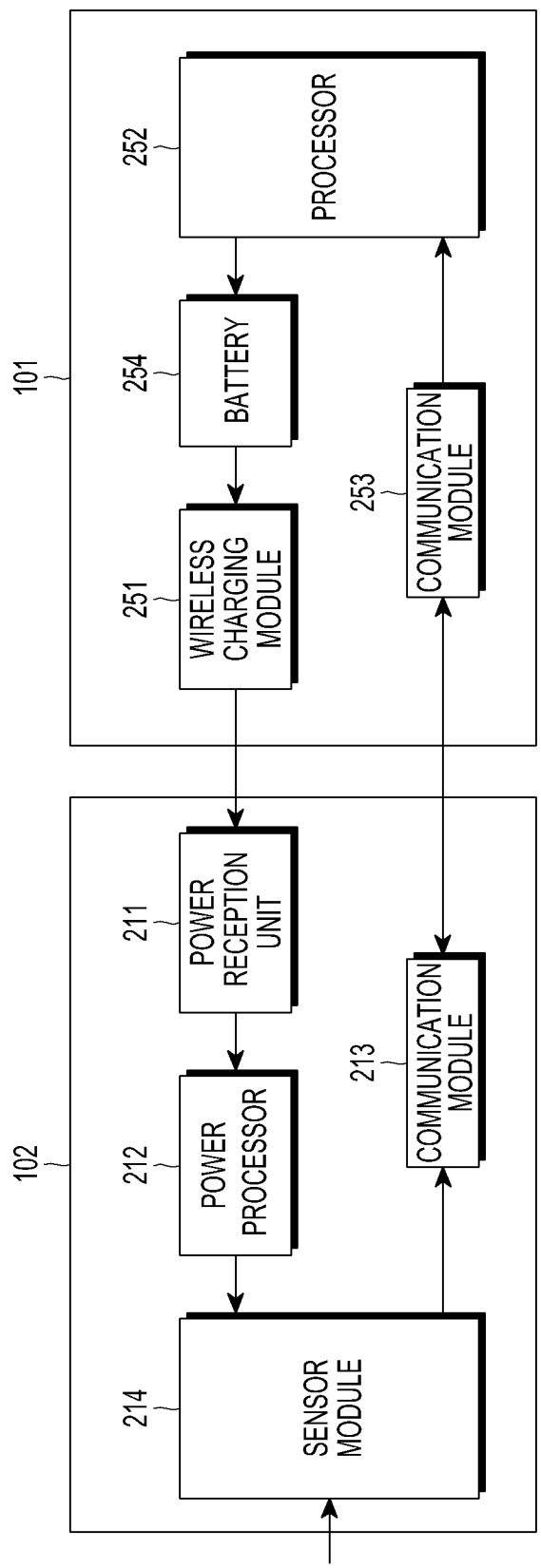
FIG. 2A is a block diagram of an electronic device and a sensor according to various embodiments of the present disclosure.

FIG. 2A is a block diagram of an electronic device and a sensor according to various embodiments of the present disclosure.

Referring to FIG. 2A, an electronic device 101 may include at least one of a wireless charging module 251, a processor 252, a communication module 253 and a battery 254.

The wireless charging module 251 may transmit wireless power to the sensor 102. The wireless charging module 251 may supply power in the form of an alternating current (AC) waveform, and/or may convert power of a direct current (DC) waveform into power of the AC waveform using an inverter and supply the power of the AC waveform. The wireless charging module 251 may receive power from the built-in battery 254, and transmit the wireless power to the sensor 102. The wireless charging module 251 may transmit the wireless power to the sensor 102 based on the induction scheme or the resonance scheme. The wireless charging module 251 may receive wireless power from a wireless power transmitter (not shown).

The processor 252 may control the overall operation of the electronic device 101. The processor 252 may control the overall operation of the electronic device 101 using the algorithm, program or application, which is read from a storage (not shown). The processor 252 may be implemented in the form of a CPU, a microprocessor, and a minicomputer.

The communication module 253 may perform communication with the sensor 102 in a predetermined manner. The communication module 253 may receive sensing data from the sensor 102. The communication module 253 may receive power information from the sensor 102. The power information may include at least one of the capacity of a wireless power receiver, the remaining battery capacity, the number of charging, the usage, the battery capacity and the battery percentage. The electronic device 101 may adjust the amount of wireless transmission power based on the received power information.

In another embodiment of the present disclosure, the communication module 253 may transmit a charging function control signal for controlling a charging function of the sensor 102. The charging function control signal may be a control signal for enabling or disabling the charging function by controlling a power reception unit 211 of the sensor 102. The power information may include information about the insertion of wired charging terminals, the switching from a stand alone (SA) mode to a non-stand alone (NSA) mode, and the release of an error mode. The charging function control signal may be information related to determination of cross-connection. For example, the charging function control signal may include identification information for determination of cross-connection, and setting information, and may also include pattern or time information related to a change in load of the sensor 102, for determination of cross-connection. The communication module 253 may receive signals from the sensor 102 and the other wireless electronic devices (not shown). The communication module 253 may receive sensing data.

In various embodiments of the present disclosure, the processor 252 may process the received sensing data, and operate based on the processing result. For example, the processor 252 may operate based on the sensing data processing result, or transmit a control signal for controlling other electronic devices.

In various embodiments of the present disclosure, the processor 252 may display the status of the sensor 102 on the display based on the message that the processor 252 has received from the sensor 102 via the communication module 253. The processor 252 may display on the display the time that is expected until the sensor 102 is fully charged.

As shown in FIG. 2A, the sensor 102 may include at least one of the power reception unit 211, a power processor 212, a communication module 213, and a sensor module 214.

The power reception unit 211 may receive wireless power from the electronic device 101. The power reception unit 211 may receive power in the form of an AC waveform. The power reception unit 211 may also receive power using the induction scheme or the resonance scheme, which may be implemented by, for example, a coil or a resonant circuit.

The power processor 212 may process the wireless power received from the electronic device 101. For example, the power processor 212 may rectify the received wireless power, and DC/DC-convert the rectified wireless power into a voltage that is used in at least one of the communication module 213 and the sensor module 214.

The sensor module 214 may perform sensing based on the power received from the power processor 212. The sensor module 214 may measure at least one of a gesture, rotation of the sensor 102, air pressure, electromagnetic waves, acceleration, grip, proximity, the red/green/blue (RGB) data, the bio-related signal, temperature, humidity, visible light, voice, and ultraviolet (UV) light. In another embodiment of the present disclosure, the sensor module 214 may sense the torsion, the corrosion and the surrounding liquid component of the implanted structure. Those skilled in the art will readily understand that the sensor module 214 is capable of collecting information about the surroundings of the sensor 102.

The communication module 213 may perform communication with the electronic device 101 in a predetermined manner. The communication module 213 may transmit sensing data to the electronic device 101. The communication module 213 may transmit the sensing data independently of wireless power transmission, using an out-of-band channel. In another embodiment of the present disclosure, the communication module 213 may transmit sensing data in an in-band manner, and in this case, the communication module 213 may include a combination of elements capable of changing the impedance. In an embodiment of the present disclosure, the communication module 213 may transmit power information. The power information may include at least one of the capacity of the sensor 102, the remaining battery capacity, the charging amount, the usage amount, the battery capacity, and the battery percentage.

In various embodiments of the present disclosure, the communication module 213 may transmit the sensing data from the sensor module 214 in the form of raw data.

In various embodiments of the present disclosure, the wireless charging module 251 may wirelessly transmit power to a powerless sensor, and the communication module 253 may receive the data that is sensed in the sensor 102 using the wirelessly transmitted power.

In various embodiments of the present disclosure, the communication module 253 may receive location information of the powerless sensor.

In various embodiments of the present disclosure, the processor 252 may control the wireless charging module 251 to transmit the power to the sensor 102, if it is determined based on the location information of the powerless sensor that a distance between the electronic device and the powerless sensor is less than a threshold.

A display (not shown) may display the received location information of the sensor 102.

In various embodiments of the present disclosure, the communication module 253 may receive power information from the sensor 102. The processor 252 may control a level of the power transmitted to the sensor 102 based on the received power information.

In various embodiments of the present disclosure, the wireless charging module 251 may transmit the power during a first period, and the communication module 253 may receive the data from the sensor 102 after a lapse of the first period.

The battery 254 may store the power, and a power reception unit (not shown) may wirelessly receive power from a wireless power transmitter and output the received power to the battery 254.

Figure 2B:
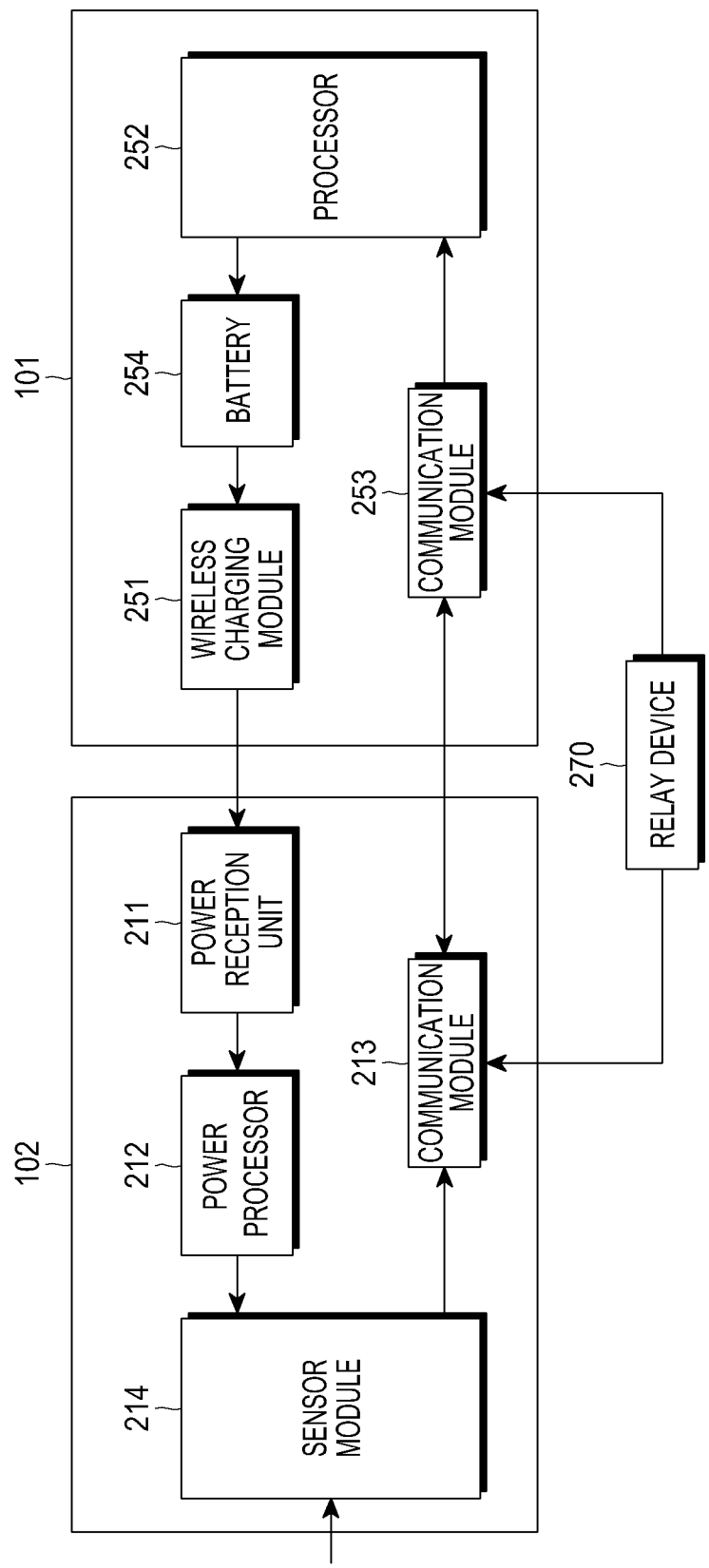
FIG. 2B is a block diagram of an electronic device and a sensor according to various embodiments of the present disclosure.

FIG. 2B is a block diagram of an electronic device and a sensor according to various embodiments of the present disclosure.

Referring to FIG. 2B, a relay device 270 may relay communications between the sensor 102 and the electronic device 101. The relay device 270 may receive sensing data from the communication module 213, and transmit the received sensing data to the communication module 253.

Figure 2C:
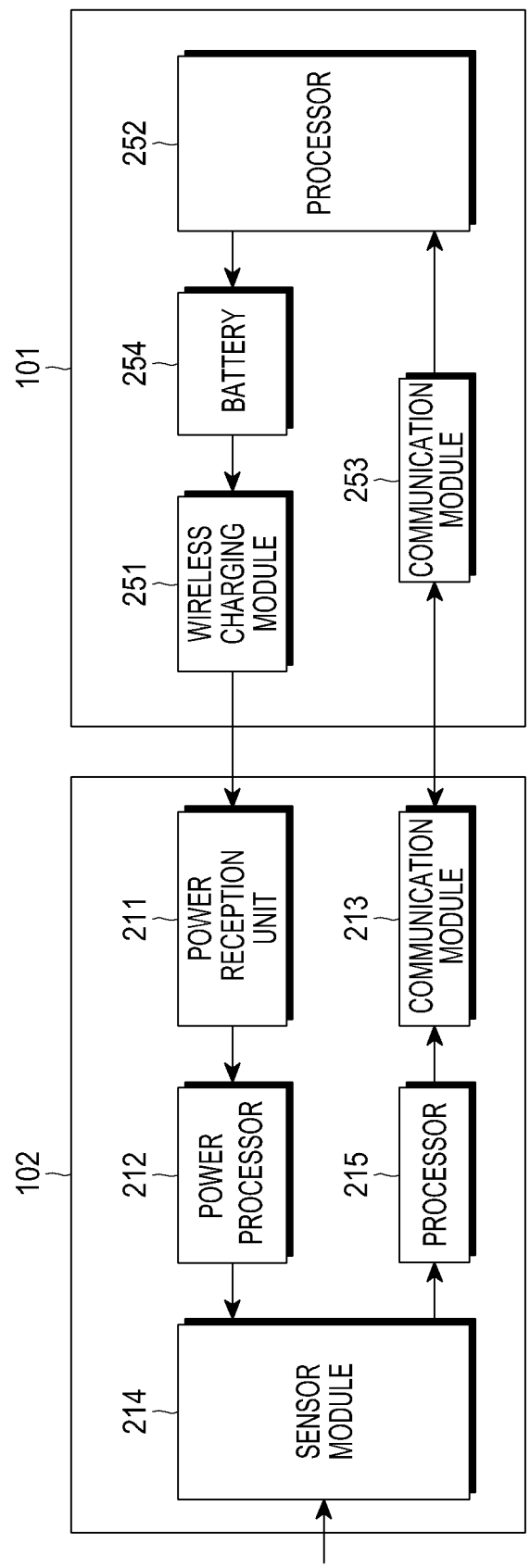
FIG. 2C is a block diagram of an electronic device and a sensor according to various embodiments of the present disclosure.

FIG. 2C is a block diagram of an electronic device and a sensor according to various embodiments of the present disclosure.

Referring to FIG. 2C, the sensor 102 may include a processor 215. The processor 215 may receive and process raw sensing data from the sensor module 214 and output the processed sensing data to the communication module 213. In other words, the sensor 102 may process sensing data, and transmit the processed sensing data to the electronic device 101.

The electronic device 101 may receive the processed sensing data, and operate based thereon.

FIGS. 3A to 3D are block diagrams of an electronic device according to various embodiments of the present disclosure.

Figure 3A:
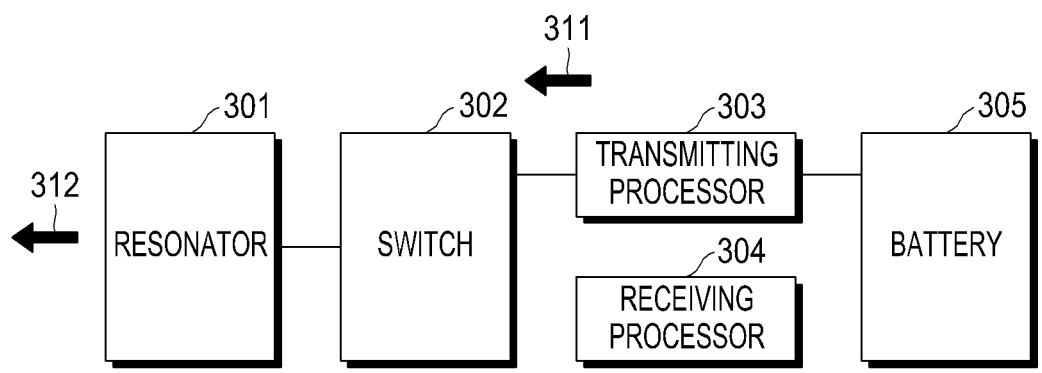
FIGS. 3A to 3D are block diagrams of an electronic device according to various embodiments of the present disclosure.
Figure 3B:
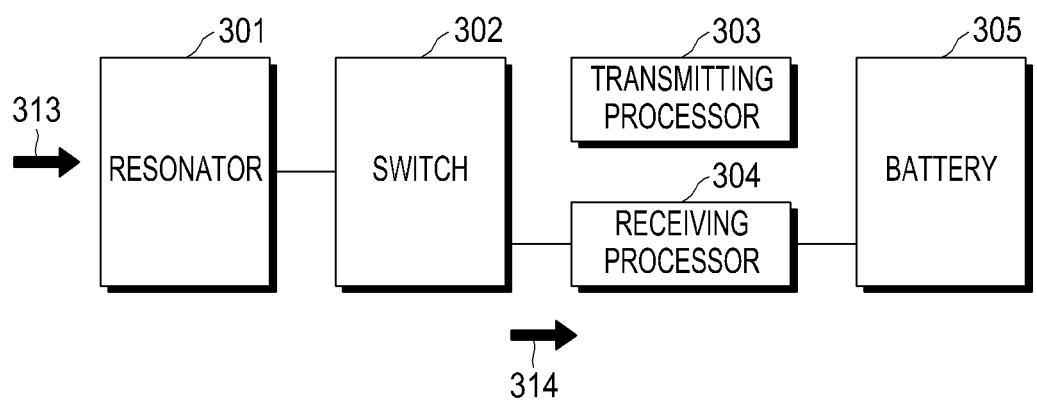

Referring to FIGS. 3A and 3B, an electronic device according to various embodiments of the present disclosure may include a resonator 301, a switch 302, a transmitting processor 303, a receiving processor 304, and a battery 305.

The resonator 301 may transmit wireless power 312 to a sensor (not shown), or receive wireless power 313 from a wireless power transmitter (not shown). The resonator 301 may transmit and receive the wireless power 312 and 313 based on the induction scheme or the resonance scheme. The resonator 301 may be designed according to the wireless power transmission/reception scheme. For example, when the resonator 301 transmits and receives wireless power based on the induction scheme, the resonator 301 may be designed to have a resonant frequency of 100 to 200 kHz. When the resonator 301 transmits and receives wireless power based on the resonance scheme, the resonator 301 may be designed to have a resonant frequency of 6.78 MHz.

The switch 302 may selectively connect the resonator 301 to any one of the transmitting processor 303 and the receiving processor 304 depending on the operation mode. For example, in the transmission mode, the switch 302 may connect the transmitting processor 303 to the resonator 301. In the reception mode, the switch 302 may connect the receiving processor 304 to the resonator 301.

The transmitting processor 303 may transfer power 311 from the battery 305 to the switch 302. Accordingly, the resonator 301 may receive the power provided from the battery 305. The resonator 301 may transmit the power provided from the battery 305 to the sensor (not shown). The transmitting processor 303 may amplify the power provided from the battery 305 with a predetermined gain. The transmitting processor 303 may invert the amplified power into power of an AC waveform.

The receiving processor 304 may process power 314 from the resonator 301 and transfer the processed power to the battery 305. For example, the receiving processor 304 may rectify the power 314 from the resonator 301. The receiving processor 304 may DC/DC-convert the rectified power and transfer the DC/DC-converted power to the battery 305.

Figure 3C:
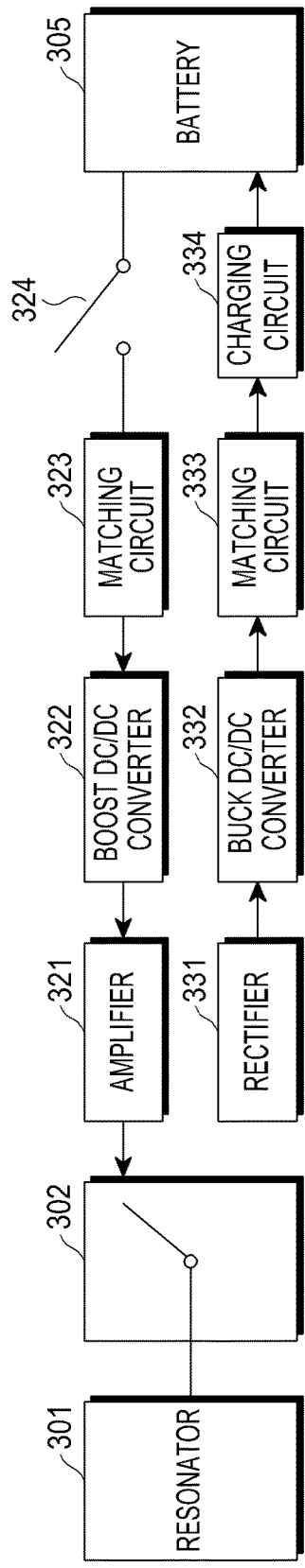

Referring to FIG. 3C, the electronic device 101 may include at least one of a resonator 301, a switch 302, a battery 305, an amplifier 321, a boost DC/DC converter 322, a matching circuit 323, a switch 324, a rectifier 331, a buck DC/DC converter 332, a matching circuit 333, and a charging circuit 334.

In the transmission mode, the switch 302 may connect the resonator 301 to the amplifier 321. In addition, the switch 324 may connect the matching circuit 323 to the battery 305. The power stored in the battery 305 may be transferred to the boost DC/DC converter 322 via the matching circuit 323. The boost DC/DC converter 322 may convert the power from the battery 305 with a predetermined gain, and transfer the converted power to the amplifier 321. The amplifier 321 may amplify the converted power and transfer the amplified power to the resonator 301. The resonator 301 may transmit the received power to the sensor (not shown). The matching circuit 323 may include at least one element for matching to increase the power transmission/reception efficiency.

In the reception mode, the switch 302 may connect the resonator 301 to the rectifier 331. In addition, the switch 324 may open the connection between the matching circuit 323 and the battery 305. The resonator 301 may receive power from a wireless power transmitter. The rectifier 331 may rectify the received power into power of an AC waveform. The buck DC/DC converter 332 may convert the rectified power with a predetermined gain and transfer the converted power to the battery 305 via the matching circuit 333 and the charging circuit 334. The charging circuit 334 may transfer the power to the battery 305 depending on the charging status of the battery 305.

Figure 3D:
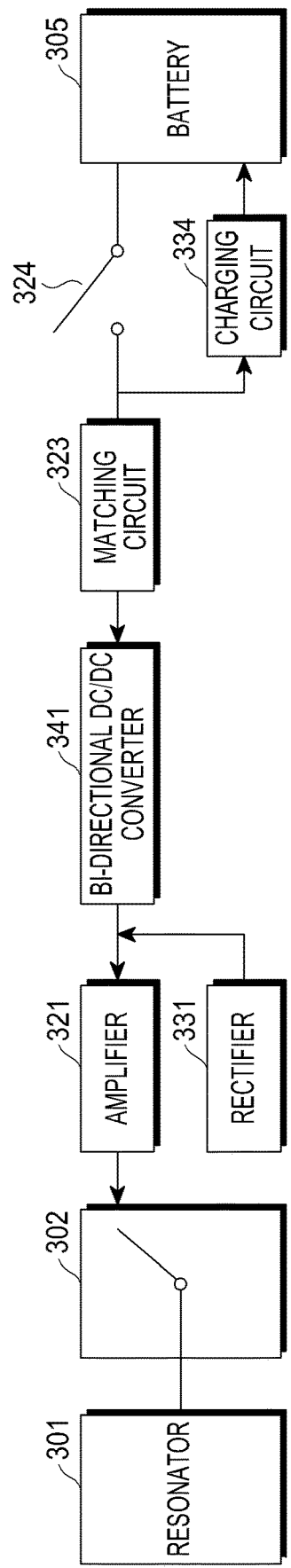

Referring to FIG. 3D, the electronic device 101 may include at least one of a resonator 301, a switch 302, a battery 305, an amplifier 321, a bi-directional DC/DC converter 341, a matching circuit 342, a switch 324, a rectifier 331, and a charging circuit 334.

In the transmission mode, the switch 302 may connect the resonator 301 to the amplifier 321. In addition, the switch 324 may connect the matching circuit 342 to the battery 305. The power stored in the battery 305 may be transferred to the bi-directional DC/DC converter 341 via the matching circuit 342. The bi-directional DC/DC converter 341 may convert the power from the battery 305 with a predetermined gain and transfer the converted power to the amplifier 321. The amplifier 321 may amplify the converted power, and transfer the amplified power to the resonator 301. The resonator 301 may transmit the received power to the sensor (not shown). The matching circuit 342 may include at least one element for matching to increase the power transmission/reception efficiency.

In the reception mode, the switch 302 may connect the resonator 301 to the rectifier 331. In addition, the switch 324 may open the connection between the matching circuit 342 and the battery 305. The resonator 301 may receive power from a wireless power transmitter. The rectifier 331 may rectify the received power into power of an AC waveform. The bi-directional DC/DC converter 341 may convert the rectified power with a predetermined gain and transfer the converted power to the battery 305 via the matching circuit 342 and the charging circuit 334. The charging circuit 334 may transfer the power to the battery 305 depending on the charging status of the battery 305.

Figure 4:
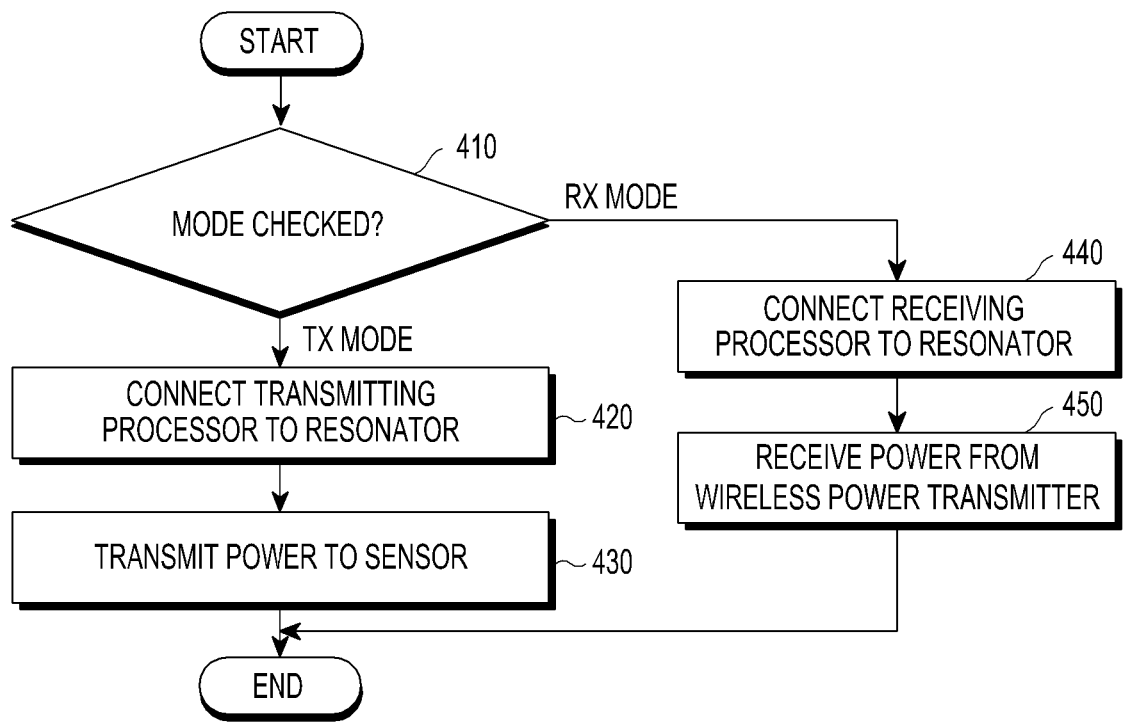
FIG. 4 is a flowchart illustrating a method of powering a sensor in an electronic device according to various embodiments of the present disclosure.

FIG. 4 is a flowchart illustrating a method of powering a sensor in an electronic device according to various embodiments of the present disclosure.

In operation 410, the electronic device 101 may determine the mode for the operation. The electronic device 101 may determine whether the mode is a wireless power reception mode or a wireless power transmission mode.

In the transmission mode, the electronic device 101 may connect a transmitting processor to a resonator in operation 420. If the transmitting processor is connected to the resonator, the resonator may transmit the power from a battery to a sensor 102 in operation 430.

In the reception mode, the electronic device 101 may connect a receiving processor to the resonator in operation 440. As described above, if the receiving processor is connected to the resonator, the resonator may receive the power from a wireless power transmitter 100 and store the received power in the battery in operation 450.

Figure 5:
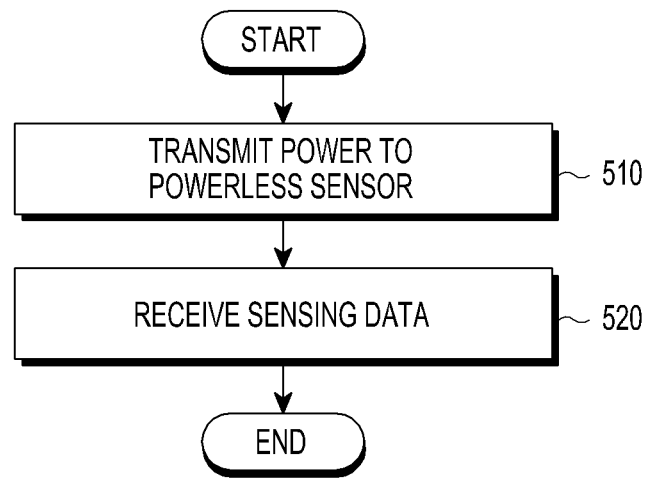
FIG. 5 is a flowchart illustrating a method of powering a sensor in an electronic device according to various embodiments of the present disclosure.

FIG. 5 is a flowchart illustrating a control method of an electronic device according to various embodiments of the present disclosure.

Referring to FIG. 5, in operation 510, the electronic device 101 may transmit wireless power to a powerless sensor. The electronic device 101, operating in the transmission mode, may connect a resonator to a transmitting processor. The electronic device 101 may transmit the power stored in its battery to the powerless sensor. The electronic device 101 may transmit the wireless power to the powerless sensor based on the induction scheme or the resonance scheme.

In various embodiments of the present disclosure, the electronic device 101 may transmit the wireless power based on predetermined conditions. In an embodiment of the present disclosure, the electronic device 101 may transmit the wireless power to the powerless sensor based on a power transmission command. For example, the user may enter a power transmission command through an I/O interface of the electronic device 101, and the electronic device 101 may transmit the wireless power in response thereto. The electronic device 101 may transmit the wireless power based on access to the powerless sensor. For example, the electronic device 101 may detect access to the powerless sensor and transmit the wireless power in response thereto.

In operation 520, the electronic device 101 may receive sensing data from the powerless sensor. In various embodiments of the present disclosure, the powerless sensor may perform sensing using the power received from the electronic device 101. The powerless sensor may transmit its sensing data to the electronic device 101 using the power received from the electronic device 101. The electronic device 101 may process the sensing data, and operate based on the processing result. For example, the electronic device 101 may operate depending on the sensing data processing result, or transmit a control signal for other electronic devices.

Figure 6A:
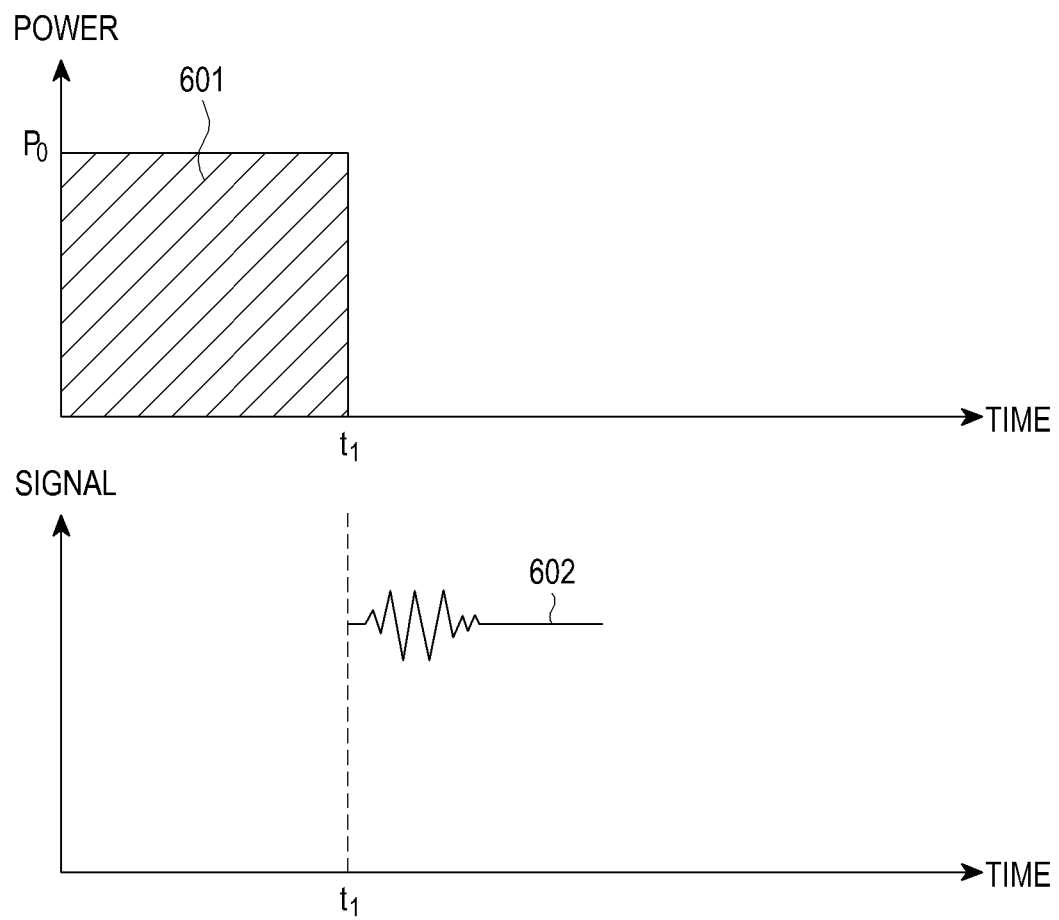
FIGS. 6A and 6B are graphs illustrating wireless power and received signals according to various embodiments of the present disclosure.
Figure 6B:
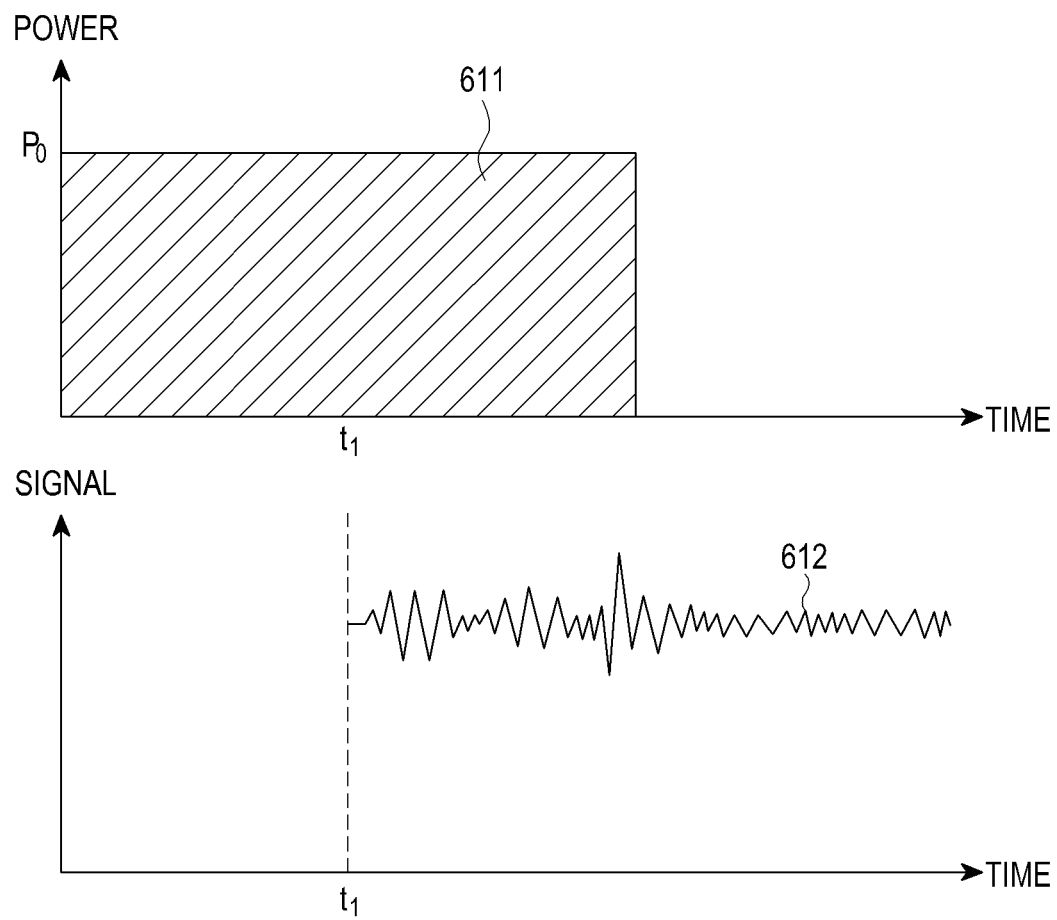

FIGS. 6A and 6B are graphs illustrating wireless power and received signals according to various embodiments of the present disclosure.

Referring to FIG. 6A, the electronic device 101 according to various embodiments of the present disclosure may transmit wireless power 601 of a level $P_0$ to a powerless sensor during a period $t_1$. For example, $P_0$ may be a value that is set regardless of the operation power of the powerless sensor, and the electronic device 101 may receive sensing data 602 from the powerless sensor after a lapse of the period $t_1$. The period $t_1$ may be a value that is set regardless of the operation power of the powerless sensor, and the period $t_1$ may be set as a sufficient power charging time for sensing and transmission of sensing data regardless of the type of the powerless sensor. For example, the powerless sensor may sense information for one-time measurement, and receive wireless power 601 for one-time sensing and transmission of sensing data.

Referring to FIG. 6B, the electronic device 101 may transmit wireless power 611 from the time the electronic device 101 starts the power transmission until the time a power transmission stop command is received. The electronic device 101 may receive sensing data 612 from the powerless sensor after a lapse of the period $t_1$. For example, the powerless sensor may sense information for continuous measurement, and may continuously receive the wireless power 611.

Figure 7:
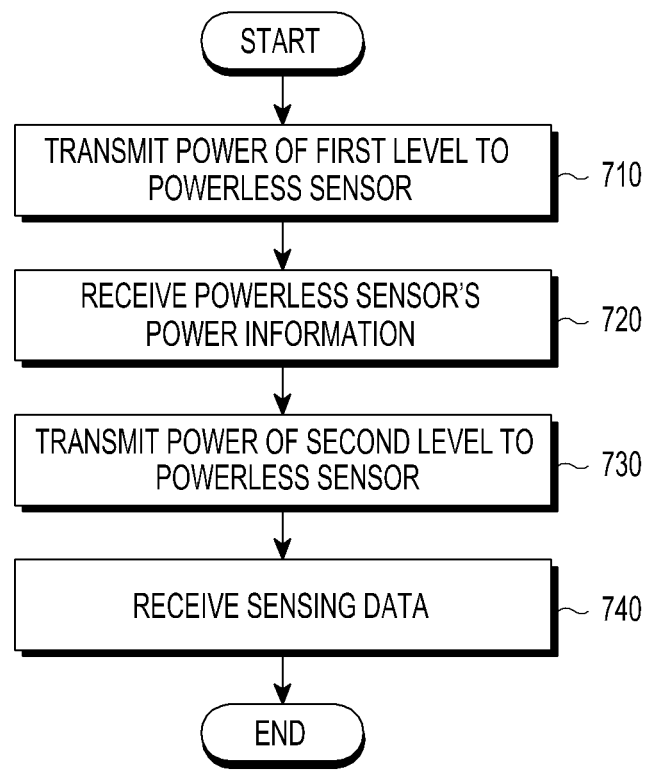
FIG. 7 is a flowchart illustrating a method of powering a sensor in an electronic device according to various embodiments of the present disclosure.
Figure 8:
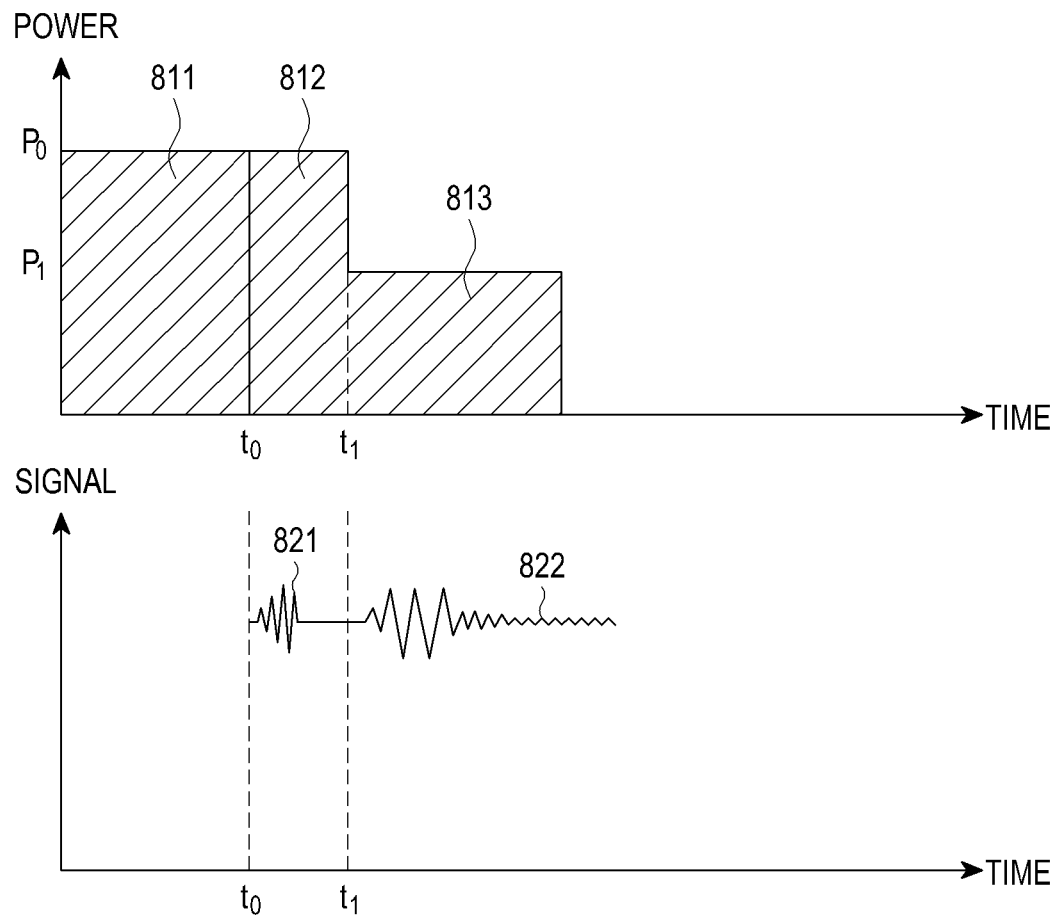
FIG. 8 illustrates graphs of wireless power and received signals according to various embodiments of the present disclosure.

FIG. 7 is a flowchart illustrating a method of powering a sensor in an electronic device according to various embodiments of the present disclosure. FIG. 8 illustrates graphs of wireless power and received signals according to various embodiments of the present disclosure.

Referring to FIGS. 7 and 8, a method of powering a sensor will be described with reference to various graphs depicting received signals according to various embodiments of the present disclosure. In operation 710, the electronic device 101 may transmit power of a first level to a powerless sensor. The first level may be set regardless of the type of the powerless sensor and the first level may be a sufficient level at which a powerless sensor of any type can transmit its own power information by being turned on. For example, the electronic device 101 may transmit wireless power 811 of a first level $P_0$ during a first period (0 to $t_0$).

In operation 720, the electronic device 101 may receive powerless sensor's power information 821 from the powerless sensor. For example, the electronic device 101 may receive the powerless sensor's power information 821 during a second period ($t_0$ to $t_1$). The powerless sensor's power information 821 may include information about at least one of an operation power and an operation period of the powerless sensor. The electronic device 101 may continuously transmit the wireless power 812 of the first level $P_0$ during the second period ($t_0$ to $t_1$). The electronic device 101 may adjust the level of the wireless power based on the powerless sensor's power information 821 received during the second period ($t_0$ to $t_1$). For example, the electronic device 101 may determine that the powerless sensor can sufficiently perform sensing and transmission of sensing data with the power of a second level $P_1$.

In operation 730, the electronic device 101 may transmit the power of the second level that is adjusted depending on the powerless sensor's power information. For example, as shown in FIG. 8, the electronic device 101 may transmit wireless power 813 of the second level $P_1$ to the powerless sensor during a third period (after $t_1$). Although the second level $P_1$ is shown to be lower than the first level $P_0$, this is merely illustrative, and the second level $P_1$ may be higher than the first level $P_0$.

In operation 740, the electronic device 101 may receive sensing data 822 from the powerless sensor.

As described above, the electronic device 101 according to various embodiments of the present disclosure may determine and transmit the power corresponding to the powerless sensor, so the wasted power may be reduced.

Figure 9:
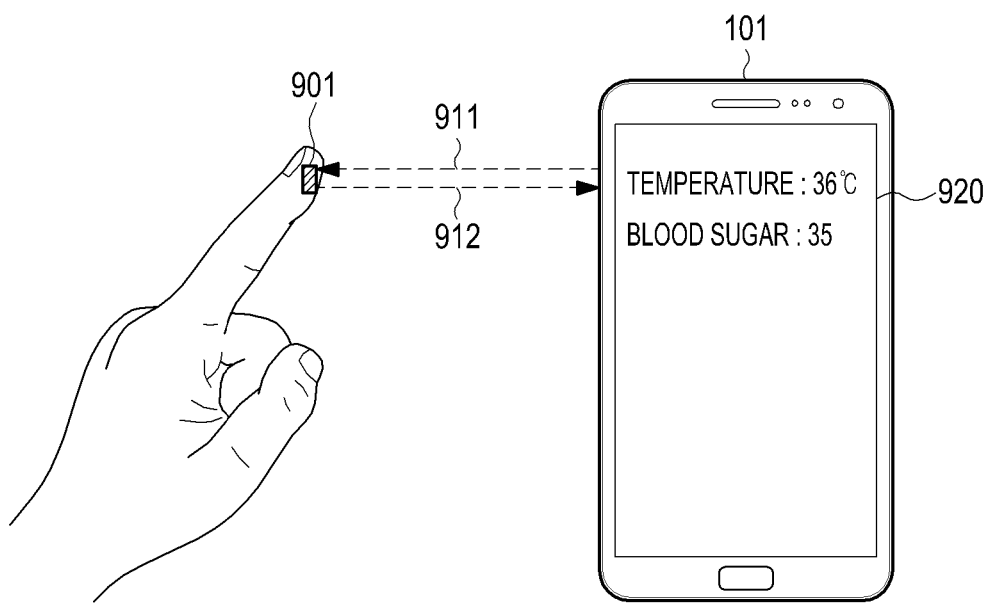
FIG. 9 illustrates an electronic device and a powerless sensor according to various embodiments of the present disclosure.

FIG. 9 illustrates an electronic device and a powerless sensor according to various embodiments of the present disclosure.

Referring to FIG. 9, a powerless sensor 901 may be implanted in a living body. The powerless sensor 901 may be implanted in the living body through, for example, the surgery. Accordingly, it may be difficult to replace the battery of the powerless sensor 901. The powerless sensor 901 according to various embodiments of the present disclosure may include a wireless charging module. Accordingly, the electronic device 101 may transmit wireless power 911 to the powerless sensor 901, and the powerless sensor 901 may receive the wireless power 911. The powerless sensor 901 may sense biometric information of the living body using the received wireless power 911. In various embodiments of the present disclosure, the powerless sensor 901 may sense a variety of biometric information such as body temperature information, blood sugar information, skin moisture information, blood pressure information, heart rate (HR) information, electroencephalogram (EEG) information, electrocardiogram (ECG) information, electromyograph (EMG) information, electrooculogram (EOG) information, and oxidation information. Those skilled in the art will readily understand that there is no limitation on the type of the data that can be sensed by the powerless sensor 901. The powerless sensor 901 may transmit sensing data 912 to the electronic device 101. As described above, the powerless sensor 901 may process and transmit the sensing data 912, or may transmit the sensing data 912 in the form of raw data.

The electronic device 101 may display a screen 920 including the received sensing data 912. In another embodiment of the present disclosure, the electronic device 101 may transmit the sensing data 912 to a healthcare device and the like. The healthcare device may manage the health of its wearer using the sensing data 912 relayed by the electronic device 101. Otherwise, the electronic device 101 may manage the health of the wearer by managing the sensing data 912 with a database.

The electronic device 101 may transmit the wireless power 911 at preset cycles, or may transmit the wireless power 911 according to an input command.

Upon receiving the wireless power 911, the powerless sensor 901 may automatically wake up to perform sensing and transmission of sensing data. In another embodiment of the present disclosure, the electronic device 101 may transmit a sensing command signal to the powerless sensor 901 while transmitting the wireless power 911. The powerless sensor 901 may perform sensing according to the received sensing command signal, and transmit the sensing data to the electronic device 101.

Figure 10:
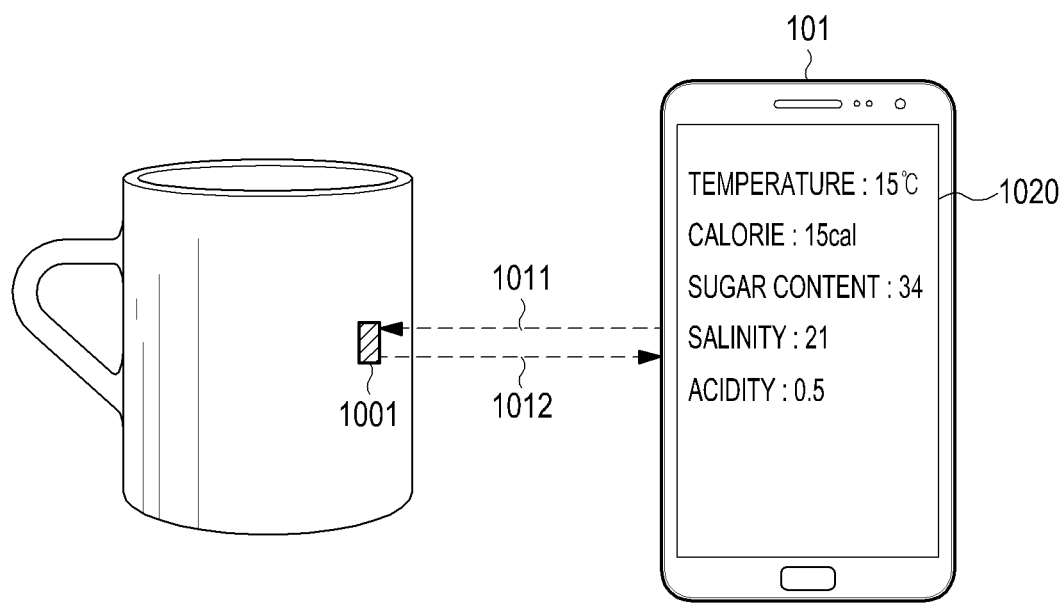
FIG. 10 illustrates an electronic device and a powerless sensor according to various embodiments of the present disclosure.

FIG. 10 illustrates an electronic device and a powerless sensor according to various embodiments of the present disclosure.

Referring to FIG. 10, a powerless sensor 1001 may be implanted in a cup. The powerless sensor 1001 may be implanted in a structure such as a cup during production. Accordingly, it may be difficult to replace the battery of the powerless sensor 1001. The powerless sensor 1001 may include a wireless charging module. Accordingly, the electronic device 101 may transmit wireless power 1011 to the powerless sensor 1001, and the powerless sensor 1001 may receive the wireless power 1011. The powerless sensor 1001 may sense structure information related to the structure in which the powerless sensor 1001 is implanted, using the received wireless power 1011. In various embodiments of the present disclosure, the powerless sensor 1001 may sense the temperature and the liquid contained in the cup. Those skilled in the art will readily understand that there is no limitation on the type of the data that can be sensed by the powerless sensor 1001. The powerless sensor 1001 may transmit sensing data 1012 to the electronic device 101. As described above, the powerless sensor 1001 may process and transmit the sensing data 1012 or may transmit the sensing data 1012 in the form of raw data.

The electronic device 101 may display a screen 1020 including the results obtained by processing the received sensing data 1012.

Upon receiving the wireless power 1011, the powerless sensor 1001 may automatically wake up to perform sensing and transmission of sensing data. In another embodiment of the present disclosure, the electronic device 101 may transmit a sensing command signal to the powerless sensor 1001 while transmitting the wireless power 1011. The powerless sensor 1001 may perform sensing according to the received sensing command signal, and transmit the sensing data to the electronic device 101.

Figure 11:
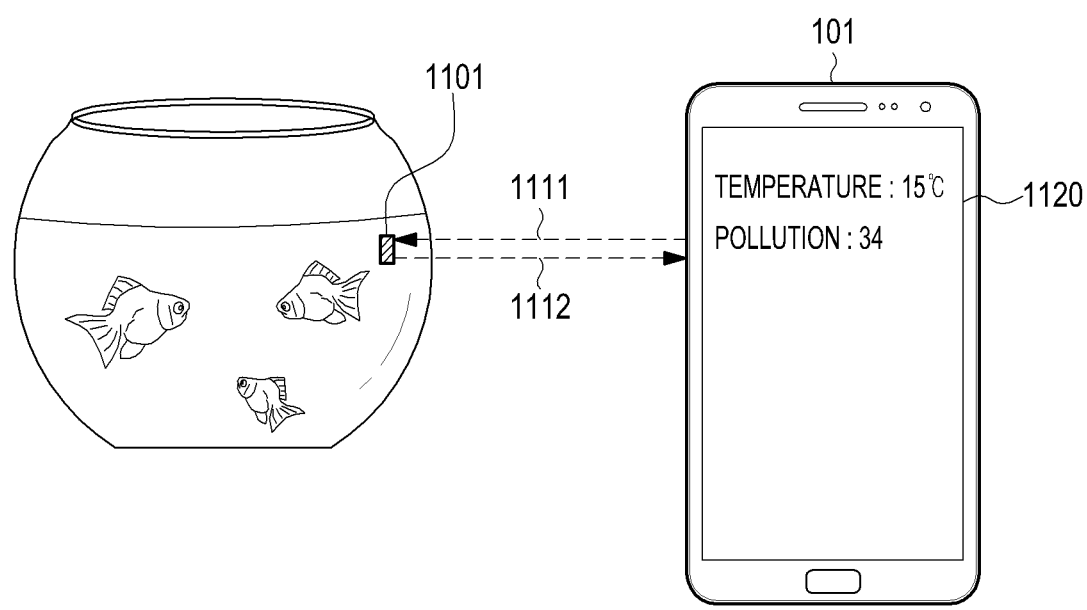
FIG. 11 illustrates an electronic device and a powerless sensor according to various embodiments of the present disclosure.

FIG. 11 illustrates an electronic device and a powerless sensor according to various embodiments of the present disclosure.

Referring to FIG. 11, a powerless sensor 1101 may be implanted in a fish bowl. The powerless sensor 1101 may be implanted in a structure such as a fish bowl during production. The powerless sensor 1101 may receive wireless power 1111 from the electronic device 101. The powerless sensor 1101 may sense information related to the liquid contained in the structure using the wireless power 1111. Those skilled in the art will readily understand that there is no limitation on the type of the data that can be sensed by the powerless sensor 1101. The powerless sensor 1101 may transmit sensing data 1112 to the electronic device 101. As described above, the powerless sensor 1101 may process and transmit the sensing data 1112, or may transmit the sensing data 1112 in the form of raw data. The electronic device 101 may display a screen 1120 including the results obtained by processing the received sensing data 1112. The electronic device 101 may transmit the received sensing data 1112 to other electronic devices.

Figure 12A:
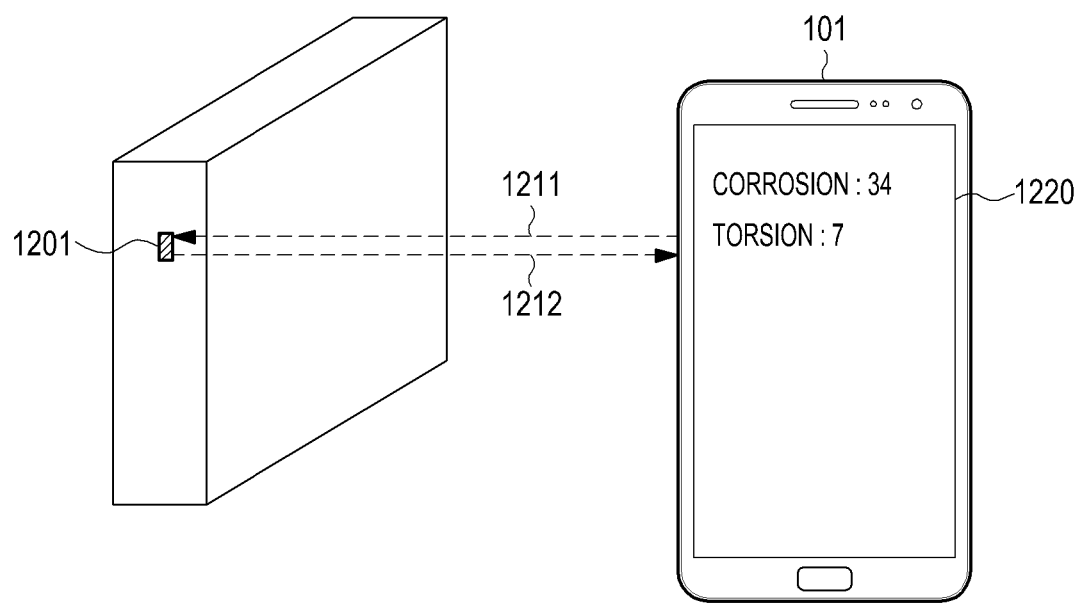
FIGS. 12A and 12B illustrate an electronic device and a powerless sensor according to various embodiments of the present disclosure.
Figure 12B:
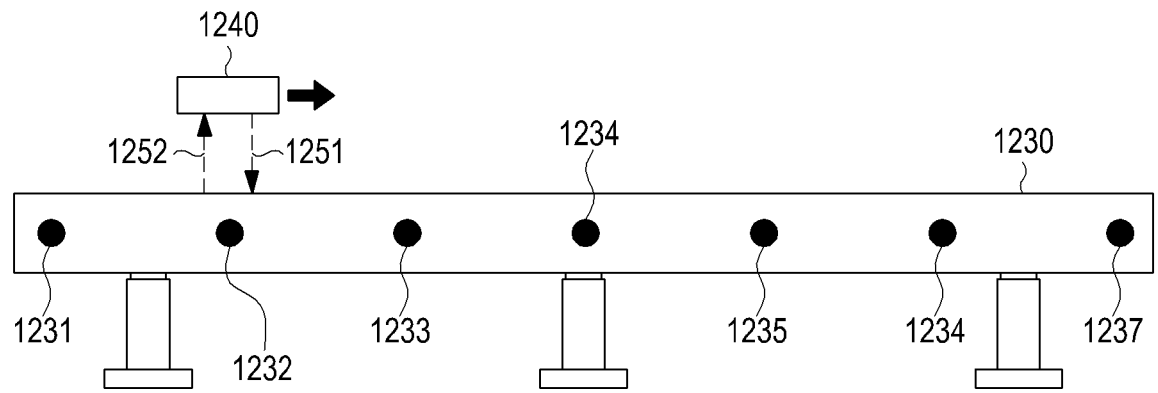

FIGS. 12A and 12B illustrate an electronic device and a powerless sensor according to various embodiments of the present disclosure.

Referring to FIG. 12A, a powerless sensor 1201 may be implanted in a rigid body such as a wall. The powerless sensor 1201 may be implanted in a structure such as a rigid body during production. The powerless sensor 1201 may receive wireless power 1211 from the electronic device 101. The powerless sensor 1201 may sense information about the interior of the structure using the wireless power 1211. For example, the powerless sensor 1201 may sense structure safety-related information such as the corrosion and torsion of the structure.

The powerless sensor 1201 may transmit its sensing data 1212 to the electronic device 101. As described above, the powerless sensor 1201 may process and transmit the sensing data 1212 or may transmit the sensing data 1212 in the form of raw data. The electronic device 101 may display a screen 1220 including the results obtained by processing the received sensing data 1212. The electronic device 101 may transmit the received sensing data 1212 to other electronic devices.

Referring to FIG. 12B, powerless sensors 1231, 1232, 1233, 1234, 1235, 1236, and 1237 may be implanted in a bridge 1230. An electronic device 1240 may be configured to traverse over the bridge 1230. The electronic device 1240 may transmit wireless power 1251 while moving across the bridge 1230. A powerless sensor (e.g., sensor 1232) that is proximate to the electronic device 1240 may receive the wireless power 1251 to sense information about the interior of the structure. For example, the powerless sensor 1232 may sense the structure safety-related information such as the corrosion and torsion of the structure. The powerless sensor may transmit its sensing data 1252 to the electronic device 1240. Based on the received sensing data 1252, the electronic device 1240 may obtain safety-related information of a bridge component corresponding to powerless sensors 1231 to 1237. The electronic device 1240 may determine the safety of the whole bridge based on the safety-related information of the bridge components.

Figure 13A:
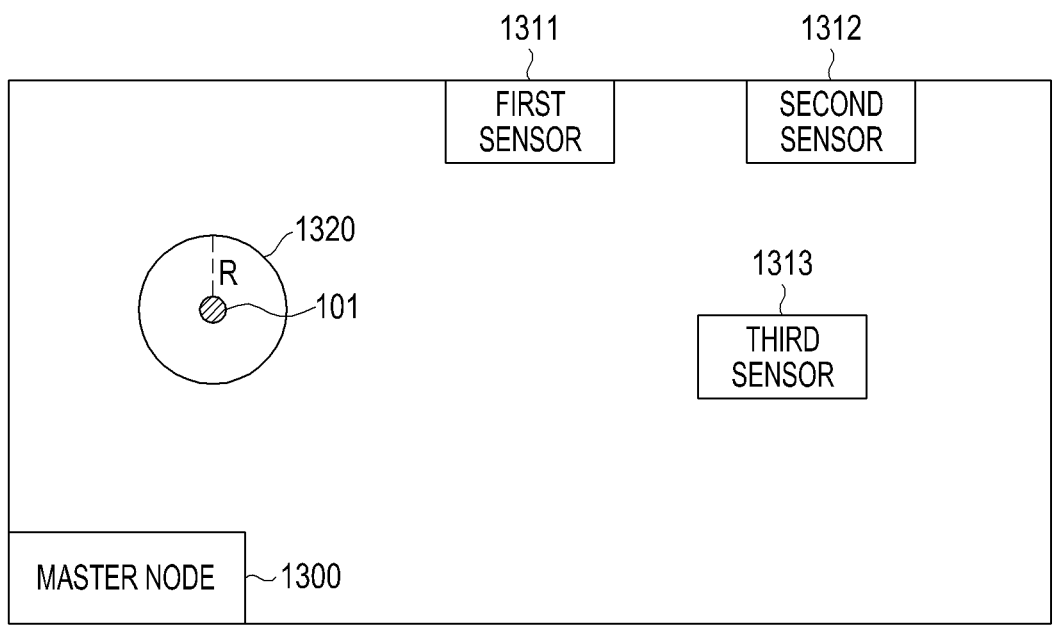
FIGS. 13A and 13B illustrate an electronic device and sensors according to various embodiments of the present disclosure.
Figure 13B:
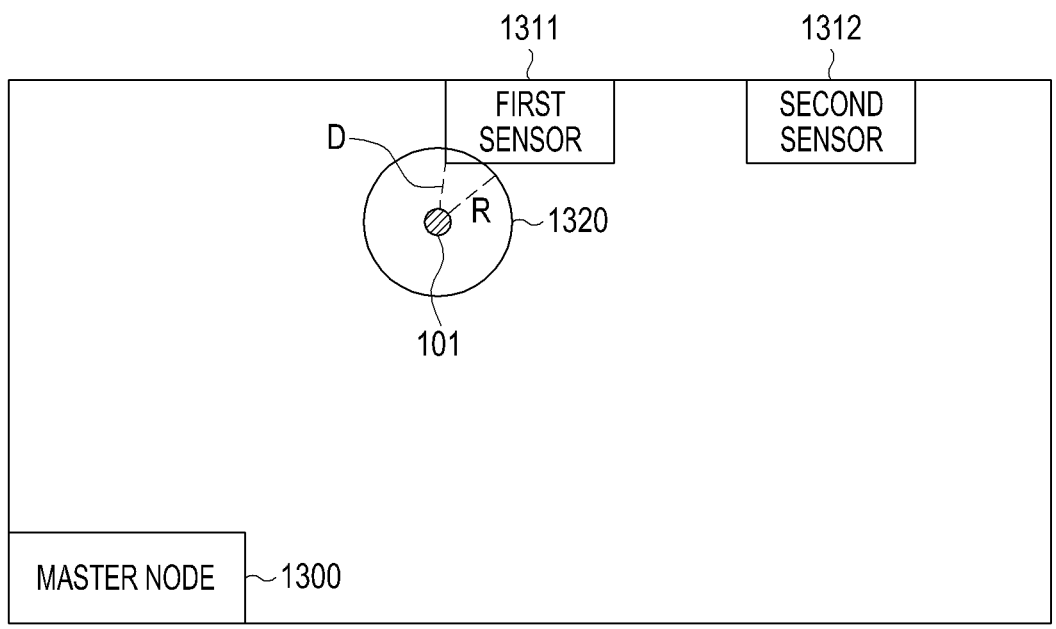

FIGS. 13A and 13B illustrate an electronic device and sensors according to various embodiments of the present disclosure.

Referring to FIG. 13A, an electronic device 101 may have a wireless charging range 1320 with a radius of R. In other words, the electronic device 101 may transmit wireless power to a powerless sensor(s) within a distance of R.

The electronic device 101 may receive powerless sensor's location information from a master node 1300. The powerless sensor's location information may include, for example, information about the placement locations of powerless sensors 1311, 1312, and 1313 for a particular area.

Based on the indoor positioning technology, the electronic device 101 may determine the locations of the powerless sensors in the particular area of the electronic device 101. Otherwise, based on a GPS signal, the electronic device 101 may determine the locations of the powerless sensors in the particular area of the electronic device 101.

Referring to FIG. 13B, if it is determined that a distance between the electronic device 101 and the powerless sensor is less than a threshold, the electronic device 101 may transmit wireless power to the powerless sensor. For example, if it is determined that the first sensor 1311 is within the wireless charging range 1320, the electronic device 101 may transmit wireless power to the first sensor 1311. In addition, the electronic device 101 may receive sensing data from the first sensor 1311. The electronic device 101 may display the received location information of the powerless sensor.

In various embodiments of the present disclosure, the electronic device 101 may periodically transmit a beacon signal. The beacon signal may have a sufficient amount of power capable of waking up a powerless sensor. The powerless sensor may respond to the beacon signal, and the electronic device 101 may transmit wireless power to the powerless sensor based on a response signal.

Figure 14:
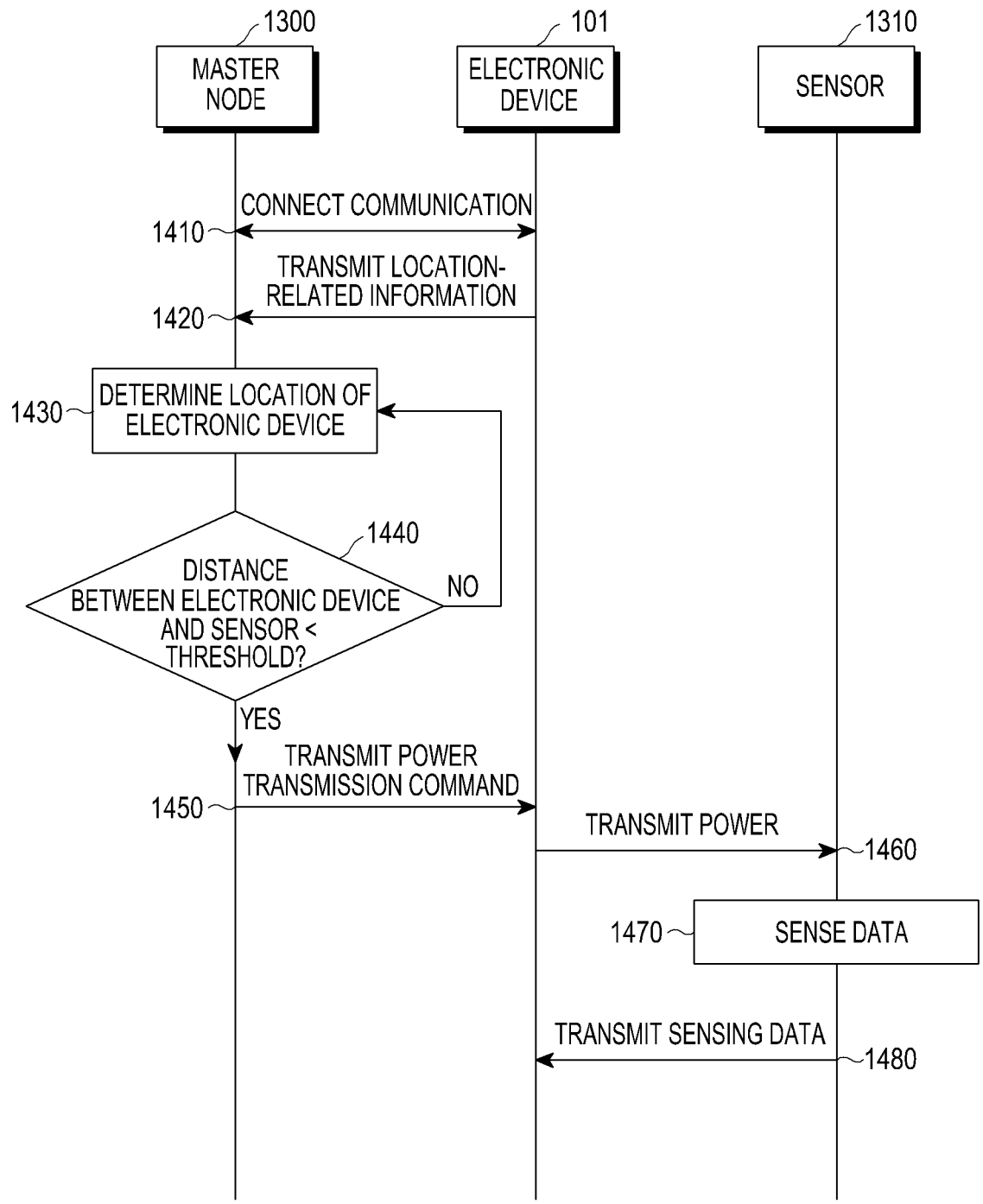
FIGS. 14 and 15 are flow diagrams of methods for powering a sensor according to various embodiments of the present disclosure.
Figure 15:
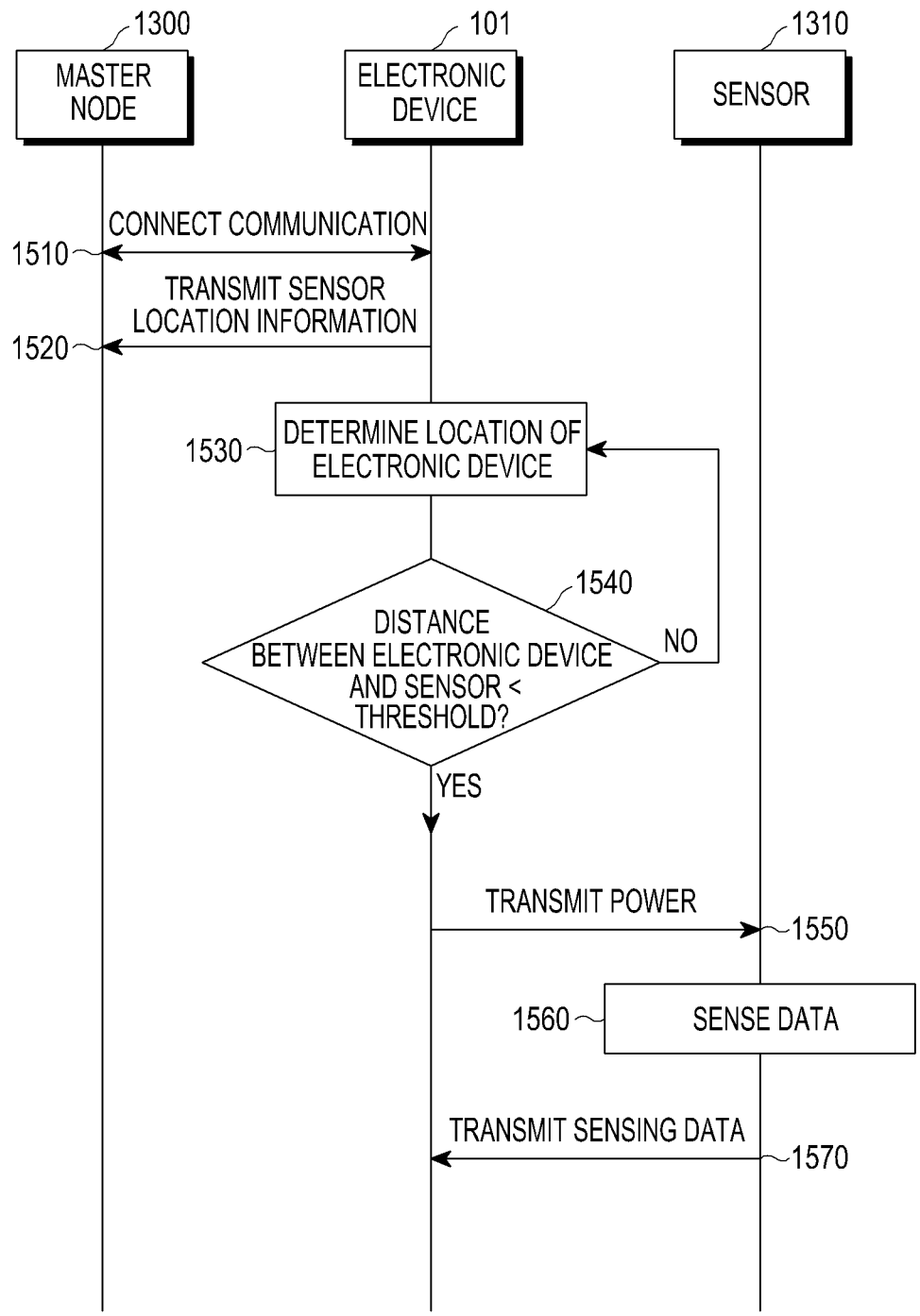

FIGS. 14 and 15 are flow diagrams of methods for powering a sensor according to various embodiments of the present disclosure.

Referring to FIG. 14, in operation 1410, the electronic device 101 may connect the communication with the master node 1300. In operation 1420, the electronic device 101 may transmit location-related information. For example, the electronic device 101 may obtain its own location-related information through GPS coordinates, and transmit the obtained location-related information to the master node 1300. In another example, the electronic device 101 may obtain its own location-related information through the indoor positioning method, and transmit the obtained location-related information to the master node 1300.

In operation 1430, the master node 1300 may determine the location of the electronic device. The master node 1300 may determine the location of the electronic device without receiving the location-related information from the electronic device. For example, the master node 1300 may determine the location of the electronic device based on the signal direction from the electronic device or may determine the location of the electronic device based on various ways such as shooting and signals from a proximity sensor.

In operation 1440, the master node 1300 may determine whether a distance between an electronic device and a powerless sensor is less than a threshold. The master node 1300 may pre-store information about the location of the powerless sensor, and based thereon, determine whether the distance between the electronic device and the powerless sensor is less than a threshold.

If the distance between the electronic device and the powerless sensor is less than a threshold, the master node 1300 may transmit a power transmission command to the electronic device 101 in operation 1450. In operation 1460, the electronic device 101 may transmit power to a powerless sensor 1310 in response to the received power transmission command. In operation 1470, the powerless sensor 1310 may sense data. In operation 1480, the powerless sensor 1310 may transmit the sensing data.

As described above, in various embodiments of the present disclosure, the master node 1300 may determine whether to transmit wireless power.

Referring to FIG. 15, in operation 1510, the electronic device 101 may connect the communication with the master node 1300. In operation 1520, the master node 1300 may transmit sensor location information to the electronic device 101.

In operation 1530, the electronic device 101 may determine location-related information of the electronic device 101. For example, the electronic device 101 may obtain its own location-related information through GPS coordinates or the electronic device 101 may obtain its own location-related information through the indoor positioning method.

In operation 1540, the electronic device 101 may determine whether a distance between an electronic device and a powerless sensor is less than a threshold. Based on the received sensor location information, the electronic device 101 may determine whether the distance between the electronic device and the powerless sensor is less than a threshold.

If the distance between the electronic device and the powerless sensor is less than a threshold, the electronic device 101 may transmit power to a powerless sensor 1310 in operation 1550. In operation 1560, the powerless sensor 1310 may sense data. In operation 1570, the powerless sensor 1310 may transmit the sensing data.

As described above, in various embodiments of the present disclosure, the electronic device 101 may determine whether to transmit wireless power.

Figure 16A:
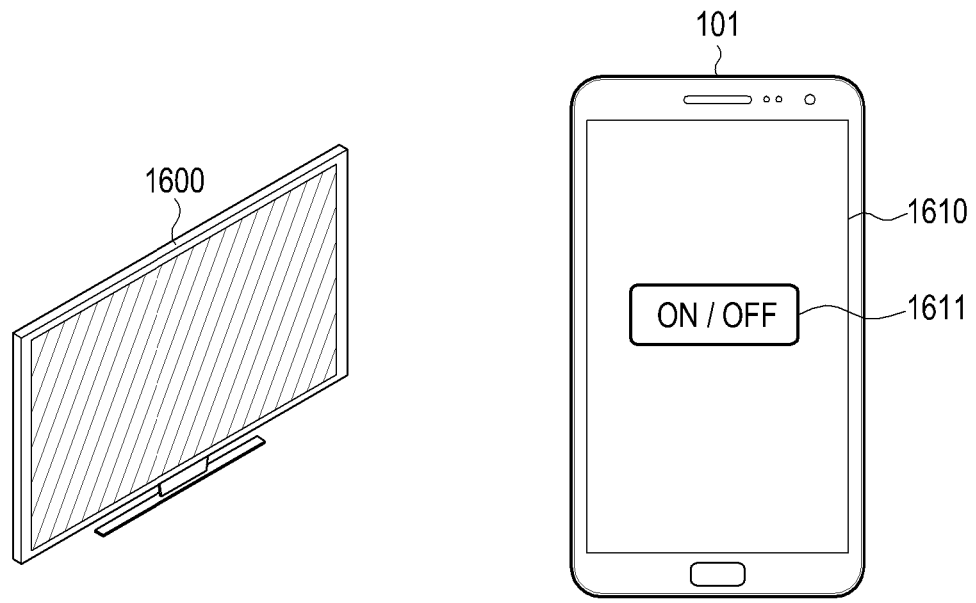
FIGS. 16A and 16B illustrate an electronic device for controlling a powerless electronic device according to various embodiments of the present disclosure.
Figure 16B:
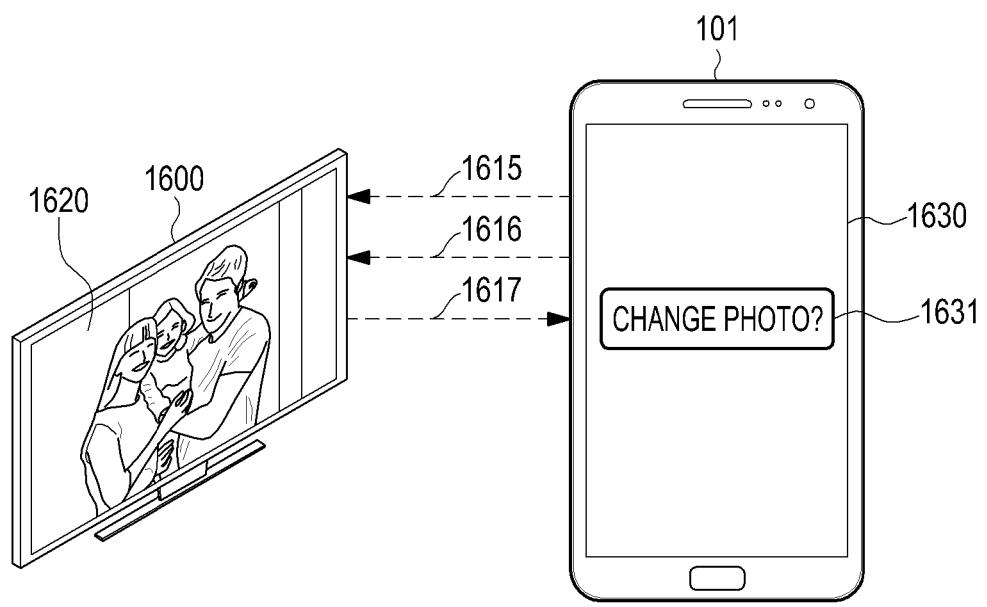

FIGS. 16A and 16B illustrate an electronic device for controlling a powerless electronic device according to various embodiments of the present disclosure.

Referring to FIG. 16A, the electronic device 101 may store and run an application for controlling a powerless electronic device 1600. The electronic device 101 may display an execution screen 1610 for the application. The execution screen 1610 for the application may first include an On/Off object 1611. The powerless electronic device 1600 may be initially turned off.

Referring to FIG. 16B, if the On/Off object 1611 is specified by the user, the electronic device 101 may transmit wireless power 1615 to the powerless electronic device 1600. The powerless electronic device 1600 may be turned on to display a screen 1620 based on the received wireless power 1615. The powerless electronic device 1600 may transmit powerless electronic device information 1617 to the electronic device 101. The powerless electronic device information 1617 may include at least one of identification information and executable operation-related information of the powerless electronic device 1600.

The electronic device 101 may display a control screen 1630 based on the received powerless electronic device information 1617. For example, based on the identification information of the powerless electronic device information 1617, the electronic device 101 may display the control screen 1630 corresponding thereto. Otherwise, the electronic device 101 may display the control screen 1630 based on the executable operation-related information of the powerless electronic device information 1617. For example, as shown in FIG. 16B, the electronic device 101 may display a Change Photo object 1631.

If the Change Photo object 1631 is specified by the user, the electronic device 101 may transmit a control signal 1616 to the powerless electronic device 1600. For example, the electronic device 101 may transmit a control signal for changing photos and the powerless electronic device 1600 may change photos in response thereto. As described above, the electronic device 101 may control the powerless electronic device.

In various embodiments of the present disclosure, the electronic device 101 may display the control screen 1630 if it is determined that a distance between the powerless electronic device 1600 and the electronic device 101 is less than a threshold.

Figure 17:
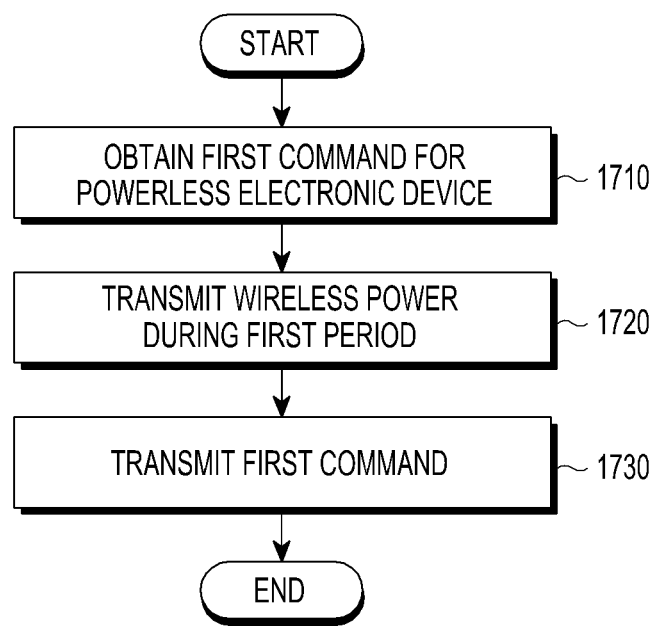
FIG. 17 is a flowchart of a method for powering a powerless electronic device according to various embodiments of the present disclosure.

FIG. 17 is a flowchart of a method for powering a powerless electronic device according to various embodiments of the present disclosure.

Referring to FIG. 17, in operation 1710, the electronic device 101 may obtain a first command for a powerless electronic device. For example, the electronic device 101 may display a control screen for controlling a powerless electronic device, and obtain a first command corresponding thereto. As described above, the electronic device 101 may display a control screen based on the powerless electronic device information received from the powerless electronic device. Otherwise, the electronic device 101 may display a control screen based on the pre-stored powerless electronic device information.

In operation 1720, the electronic device 101 may wirelessly transmit power during a first period. The first period may be set as the time for charging the power with which the powerless electronic device can perform the first command.

In operation 1730, after the first period lapses, the electronic device 101 may transmit the first command to the powerless electronic device. After wirelessly receiving the power during the first period, the powerless electronic device may receive the first command and perform the first command.

Figure 18:
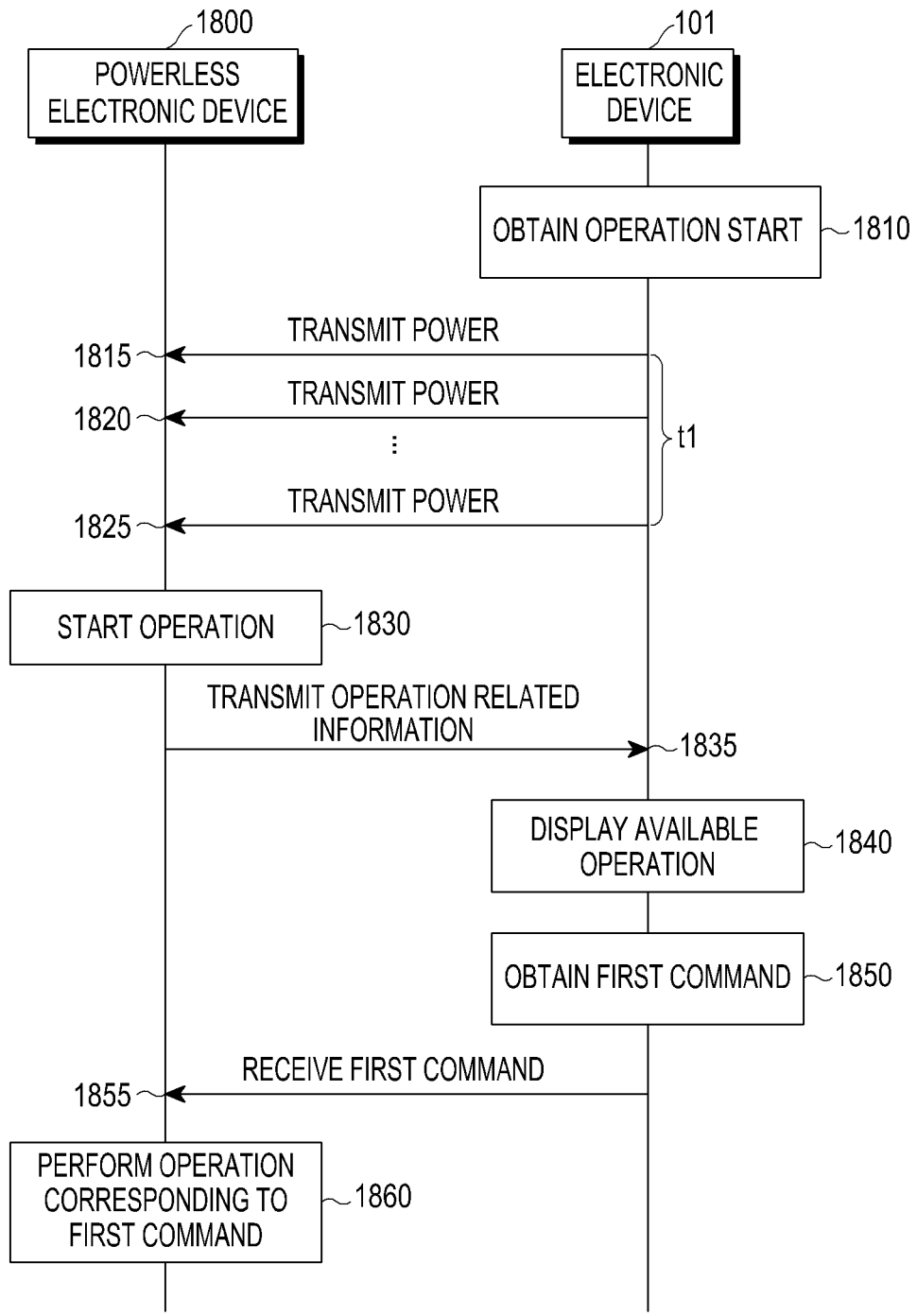
FIG. 18 is a flow diagram of powering a powerless electronic device according to various embodiments of the present disclosure.

FIG. 18 is a flow diagram for powering a powerless electronic device according to various embodiments of the present disclosure.

Referring to FIG. 18, in operation 1810, the electronic device 101 may obtain an operation start for a powerless electronic device 1800. As described above, the electronic device 101 may display a graphic user interface for the operation start, and may obtain the operation start for the powerless electronic device 1800 through the graphic user interface.

In operations 1815, 1820, and 1825, the electronic device 101 may transmit wireless power to the powerless electronic device 1800. The electronic device 101 may transmit wireless power to the powerless electronic device 1800 during a first period $t_1$.

In operation 1830, the powerless electronic device 1800 may start its operation based on the received power. In operation 1835, the powerless electronic device 1800 may transmit its operation-related information to the electronic device 101. In operation 1840, the electronic device 101 may display an operation available by the powerless electronic device 1800. In various embodiments of the present disclosure, the electronic device 101 may display a graphic user interface including the operation available by the powerless electronic device 1800. In operation 1850, the electronic device 101 may obtain a first command through the graphic user interface.

In operation 1855, the electronic device 101 may transmit the first command to the powerless electronic device 1800. In operation 1860, the powerless electronic device 1800 may perform an operation corresponding to the first command.

Figure 19:
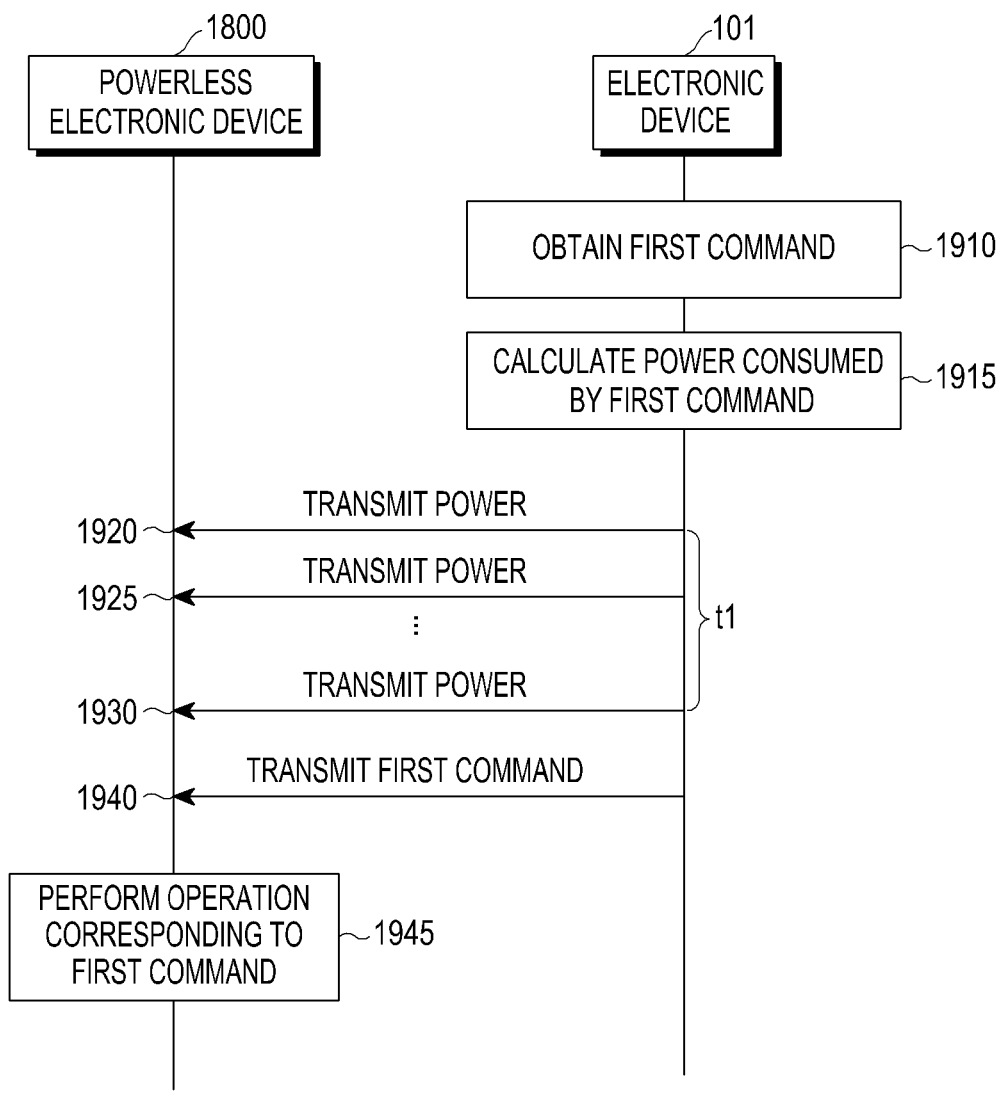
FIG. 19 is a flow diagram of powering a powerless electronic device according to various embodiments of the present disclosure.

FIG. 19 is a flow diagram of powering a powerless electronic device according to various embodiments of the present disclosure.

Referring to FIG. 19, in operation 1910, the electronic device 101 may obtain a first command that the powerless electronic device 1800 will perform. For example, the electronic device 101 may display an operation available by the powerless electronic device 1800. In various embodiments of the present disclosure, the electronic device 101 may display a graphic user interface including the operation available by the powerless electronic device 1800.

In operation 1915, the electronic device 101 may calculate the amount of power consumed by the first command. The electronic device 101 may pre-store associated information between a command and the amount of power consumed, and based thereon, may obtain the amount of power consumed by the first command.

In operations 1920, 1925, and 1930, the electronic device 101 may transmit wireless power during a first period $t_1$ based on the amount of power consumed by the first command.

In operation 1940, the electronic device 101 may transmit the first command. In operation 1945, the powerless electronic device 1800 may perform an operation corresponding to the first command.

In various embodiments of the present disclosure, a control method of an electronic device may include wirelessly transmitting power to a powerless sensor and receiving data that is sensed in the powerless sensor using the wirelessly transmitted power.

In various embodiments of the present disclosure, the control method may further include receiving location information of the powerless sensor.

In various embodiments of the present disclosure, the control method may further include transmitting the power to the powerless sensor, if it is determined based on the location information of the powerless sensor that a distance between the electronic device and the powerless sensor is less than a threshold.

In various embodiments of the present disclosure, the control method may further include displaying the received location information of the powerless sensor.

In various embodiments of the present disclosure, the control method may further include receiving power information from the powerless sensor.

In various embodiments of the present disclosure, the control method may further include controlling a level of the power transmitted to the powerless sensor based on the received power information.

In various embodiments of the present disclosure, a control method of an electronic device for controlling a powerless electronic device may include obtaining a control command for the powerless electronic device, wirelessly transmitting power for operation to the powerless electronic device, and transmitting a control signal corresponding to the control command to the powerless electronic device.

In various embodiments of the present disclosure, the wirelessly transmitting of the power for operation to the powerless electronic device may include transmitting the power for operation during a first period in which target power for performing an operation corresponding to the control signal is charged.

In various embodiments of the present disclosure, the control method may further include reading associated information between the pre-stored control signal and the target power. The wirelessly transmitting of the power for operation to the powerless electronic device may include determining the target power based on the read associated information.

In various embodiments of the present disclosure, the control method may further include receiving location information of the powerless electronic device.

In various embodiments of the present disclosure, the control method may further include displaying a user interface for control of the powerless electronic device, if it is determined based on the location information of the powerless electronic device that a distance between the electronic device and the powerless electronic device is less than a threshold.

In various embodiments of the present disclosure, the control method may further include receiving power information from the powerless electronic device.

In various embodiments of the present disclosure, the control method may further include controlling a level of the power transmitted to the powerless electronic device based on the received power information.

Figure 20:
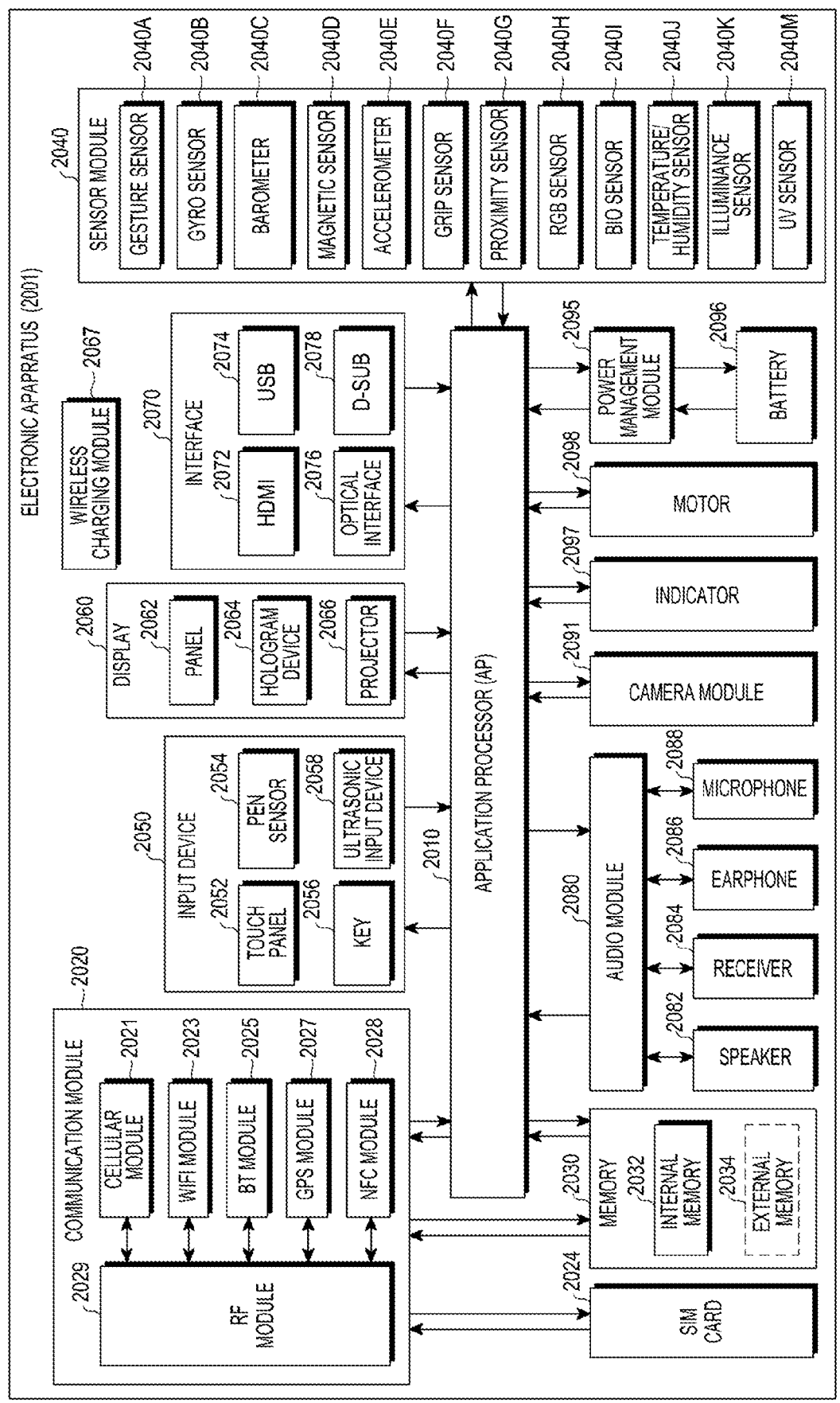
FIG. 20 is a block diagram of an electronic device according to various embodiments of the present disclosure.

FIG. 20 is a block diagram of an electronic device according to various embodiments of the present disclosure.

Referring to FIG. 20, an electronic device 2001 may include, for example, the whole or a party of the electronic device 101 shown in FIG. 1B. For example, the electronic device 101 shown in FIG. 1B may include the whole or a part of the electronic device 2001. The electronic device 2001 may include at least AP 2010, a communication module 2020, a subscriber identification module (SIM) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The AP 2010 may control a plurality of hardware or software components connected to the AP 2010 by running, for example, the operating system or an application program, and may process and calculate various data. The AP 2010 may be implemented as, for example, a system on chip (SoC). In an embodiment of the present disclosure, the AP 2010 may further include a graphic processing unit (GPU) and/or an image signal processor. The AP 2010 may include at least some (e.g., a cellular module 2021) of the components shown in FIG. 20. The AP 2010 may load, on a volatile memory, a command or data received from at least one of other components (e.g., non-volatile memory) and process the loaded command or data, and may store a variety of data in a non-volatile memory.

The communication module 2020 may have a structure which is the same as or similar to that of the communication module 170 in FIG. 1B. The communication module 2020 may include, for example, the cellular module 2021, a Wi-Fi module 2023, a BT module 2025, a GPS module 2027, an NFC module 2028, and a radio frequency (RF) module 2029.

The cellular module 2021 may provide, for example, a voice call service, a video call service, a messaging service or an Internet service over a communication network. In an embodiment of the present disclosure, the cellular module 2021 may identify and authenticate the electronic device 2001 within the communication network using a SIM (e.g., the SIM card 2024). In an embodiment of the present disclosure, the cellular module 2021 may have some of the functions that can be provided by the AP 2010. In an embodiment of the present disclosure, the cellular module 2021 may include a communication processor (CP).

Each of the Wi-Fi module 2023, the BT module 2025, the GPS module 2027 or the NFC module 2028 may include, for example, a processor for processing the data transmitted or received through the corresponding module. In various embodiments of the present disclosure, at least some (e.g., two or more) of the cellular module 2021, Wi-Fi module 2023, the BT module 2025, the GPS module 2027 or the NFC module 2028 may be included in one integrated chip (IC) or IC package.

The RF module 2029 may transmit and receive, for example, communication signals (e.g., RF signals). The RF module 2029 may include, for example, a transceiver, a power amplifier module (PAM), a frequency filter, a low noise amplifier (LNA), or an antenna. In another embodiment of the present disclosure, at least one of the cellular module 2021, the Wi-Fi module 2023, the BT module 2025, the GPS module 2027 or the NFC module 2028 may transmit and receive RF signals through a separate RF module.

The SIM card 2024 may include, for example, a card with a SIM and/or an embedded SIM. The SIM card 2024 may include unique identification information (e.g., integrated circuit card identifier (ICCID)) or subscriber information (e.g., international mobile subscriber identity (IMSI)).

The memory 2030 (e.g., the memory 130) may include, for example, an internal memory 2032 or an external memory 2034. The internal memory 2032 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD)).

The external memory 2034 may further include a flash drive, for example, compact flash (CF), secure digital (SD), micro-SD), mini-SD), extreme digital (xD), a memory stick or the like. The external memory 2034 may be functionally and/or physically connected to the electronic device 2001 through various interfaces.

The sensor module 2040 may, for example, measure the physical quantity or detect the operating status of the electronic device 2001, and convert the measured or detected information into an electrical signal. The sensor module 2040 may include at least one of, for example, a gesture sensor 2040A, a gyro sensor 2040B, a barometer 2040C, a magnetic sensor 2040D, an accelerometer 2040E, a grip sensor 2040F, a proximity sensor 2040G, a color sensor (e.g., RGB sensor) 2040H, a biosensor 20401, a temperature/humidity sensor 2040J, an illuminance sensor 2040K, or a UV sensor 2040M. Additionally or alternatively, the sensor module 2040 may include, for example, an E-nose sensor, an EMG sensor, an EEG sensor, an ECG sensor, an IR sensor, an iris sensor and/or a fingerprint sensor. The sensor module 2040 may further include a control circuit for controlling at least one or more sensors belonging thereto. In various embodiments of the present disclosure, the electronic device 2001 may further include a processor configured to control the sensor module 2040, independently of or as a part of the AP 2010, and may control the sensor module 2040 while the AP 2010 is in a sleep state.

The input device 2050 may include, for example, a touch panel 2052, a (digital) pen sensor 2054, a key 2056, or an ultrasonic input device 2058. The touch panel 2052 may use at least one of, for example, capacitive, resistive, IR or ultrasonic scheme. The touch panel 2052 may further include a control circuit. The touch panel 2052 may further include a tactile layer, to provide a tactile or haptic feedback to the user.

The (digital) pen sensor 2054, for example, may be a part of the touch panel 2052, or may include a separate recognition sheet. The key 2056 may include, for example, a physical button, an optical key or a keypad. The ultrasonic input device 2058 may check data by detecting sound waves with a microphone (e.g., a microphone 2088) in the electronic device 2001 through an input tool for generating an ultrasonic signal.

The display 2060 (e.g., the display 160) may include a panel 2062, a hologram device 2064, or a projector 2066. The panel 2062 may include a structure which is the same as or similar to that of the display 160 in FIG. 1B. The panel 2062 may be implemented to be, for example, flexible, transparent or wearable. The panel 2062, together with the touch panel 2052, may be implemented as one module. The hologram device 2064 may show stereoscopic images in the air using the interference of the light. The projector 2066 may display images by projecting the light on the screen. The screen may be disposed on the inside or outside of, for example, the electronic device 2001. In an embodiment of the present disclosure, the display 2060 may further include a control circuit for controlling the panel 2062, the hologram device 2064, or the projector 2066.

The interface 2070 may include, for example, an HDMI 2072, a USB 2074, an optical interface 2076 or D-subminiature (D-sub) 2078. The interface 2070 may be included in, for example, the communication module 170 shown in FIG. 1B. Additionally or alternatively, the interface 2070 may include, for example, a mobile high-definition link (MHL) interface, an SD card/multi-media card (MMC) interface or an IR data association (IrDA) interface.

The audio module 2080, for example, may convert the sound and electrical signals bi-directionally. At least some components of the audio module 2080 may be included in, for example, the I/O interface 150 shown in FIG. 1B. The audio module 2080 may process the sound information that is received or output through, for example, a speaker 2082, a receiver 2084, an earphone 2086 or the microphone 2088.

The camera module 2091 is, for example, a device capable of capturing still images and videos. In an embodiment of the present disclosure, the camera module 2091 may include one or more image sensors (e.g., a front image sensor or a rear image sensor), a lens, an image signal processor (ISP), or a flash (e.g., an LED or xenon lamp).

The power management module 2095 may, for example, manage the power of the electronic device 2001. In an embodiment of the present disclosure, the power management module 2095 may include, for example, a power management integrated circuit (PMIC), a charger integrated circuit (IC), or a battery or fuel gauge. The PMIC may have a wired and/or wireless charging scheme. The wireless charging scheme may include, for example, a magnetic resonance scheme, a magnetic induction scheme, or an electromagnetic scheme, and the power management module 2095 may further include additional circuits (e.g., a coil loop, a resonant circuit, a rectifier or the like) for wireless charging. The battery or fuel gauge may, for example, measure the remaining capacity, charging voltage, charging current or temperature of the battery 2096. The battery 2096 may include, for example, a rechargeable battery and/or a solar battery.

The indicator 2097 may indicate specific status (e.g., boot status, message status, charging status or the like) of the electronic device 2001 or a part (e.g. the AP 2010) thereof. The motor 2098 may convert an electrical signal into mechanical vibrations, thereby generating a vibration or haptic effect. Although not shown, the electronic device 2001 may include a processing device (e.g., GPU) for mobile TV support. The processing device for mobile TV support may process media data that is based on the standards such as, for example, digital multimedia broadcasting (DMB), digital video broadcasting (DVB) or mediaFLO™.

The electronic apparatus 2001 may also include a wireless charging module 2067.

Each of above-described components of the electronic device 2001 may be configured with one or more components, names of which may vary depending on the type of the electronic device 2001. In various embodiments of the present disclosure, the electronic device 2001 may include at least one of the above-described components, some of which may be omitted, or may further include additional other components. Further, some of the components of the electronic device 2001 according to various embodiments of the present disclosure may be configured as one entity by being combined, thereby performing the previous functions of the components in the same manner.

Figure 21A:
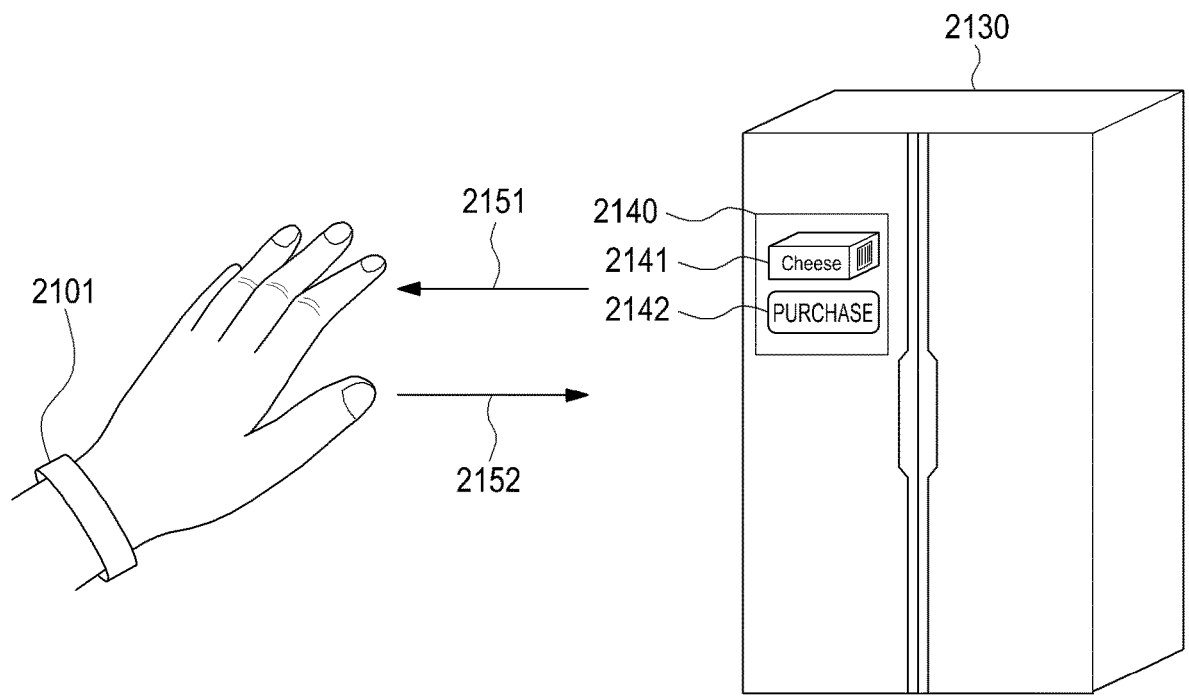
FIGS. 21A and 21B are diagrams of a powerless electronic device and an electronic device according to various embodiments of the present disclosure.
Figure 21B:
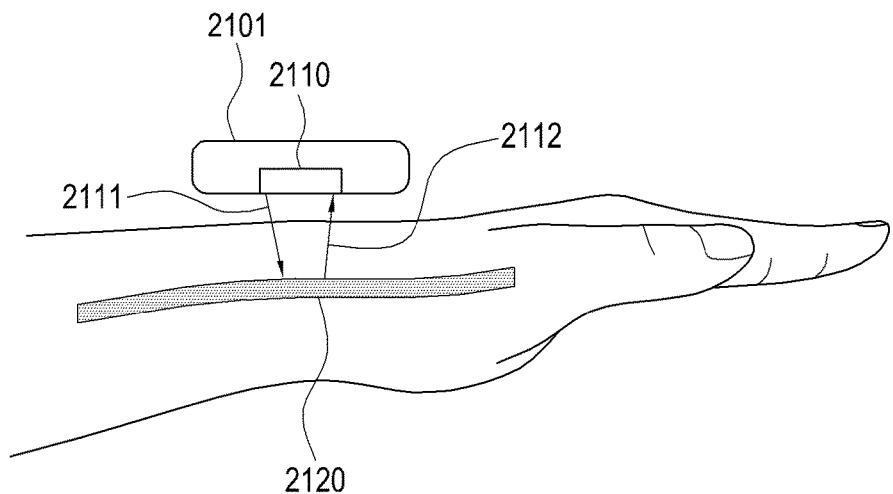

FIGS. 21A and 21B are diagrams of a powerless electronic device and an electronic device according to various embodiments of the present disclosure.

Referring to FIG. 21A, for a powerless electronic device 2101 as a band-type wearable electronic device, the user may wear the powerless electronic device 2101 on his/her wrist. The powerless electronic device 2101 may include, for example, an elastic material, so that the powerless electronic device 2101 may be worn on the user's wrist in close contact with the wrist. Meanwhile, the powerless electronic device 2101 may include a sensor capable of sensing the user's biometric information, and a detailed description thereof will be made with reference to FIG. 21B. In addition, the powerless electronic device 2101 may include no battery, so that the powerless electronic device 2101 may be manufactured to be small in size and light in weight. In an embodiment of FIG. 21A, the powerless electronic device 2101 is implemented as a band-type electronic device. However, there is no limit on the implementation type of the powerless electronic device, and the powerless electronic device 2101 may be implemented as various types of electronic devices such as a ring-type electronic device, a necklace-type electronic device, an implantable electronic device, and a wrist-type electronic device.

An electronic device 2130 may be implemented in the form of a refrigerator. Since one of various types of operating systems (OSs) can be installed in the refrigerator, various types of application programs (hereinafter, application) may be installed and run in the refrigerator. And, the refrigerator may include a high-definition large-screen display 2140. In addition, the refrigerator may include a communication module, so the refrigerator may communicate with other electronic devices through the communication module. For example, the refrigerator may install and run an electronic commerce (E-commerce) application, and may display an execution screen 2141 of the E-commerce application on the display 2140. The user may input a command for the E-commerce application through a touch panel installed to correspond to the display 2140 or through other I/O interfaces. For example, the user may input a purchase request for a specific item by choosing a purchase button 2142 displayed on the execution screen 2141 of the E-commerce application. Accordingly, the user may manipulate the refrigerator so as to send a purchase request for a specific item, using the E-commerce application. Meanwhile, the E-commerce application of the electronic device 2130 may perform user authentication for confirmation of the purchase. For example, the E-commerce application may perform user authentication using the user's biometric information.

If a user authentication is required, the electronic device 2130 may wirelessly transmit power 2151 to the powerless electronic device 2101. The powerless electronic device 2101 may sense biometric information from the user wearing the powerless electronic device 2101 using the received power 2151, and transmit a signal 2152 including the sensed biometric information to the electronic device 2130 using the received power 2151.

The electronic device 2130 may perform user authentication using the biometric information included in the received signal 2152, and operate according to the result of the user authentication. For example, if the user authentication result is a success, the electronic device 2130 may proceed with the purchase for a specific item, and if the user authentication result is a failure, the electronic device 2130 may stop proceeding with the purchase for the specific item. As described above, the electronic device 2130 may perform user authentication by obtaining the user's biometric information without the separate user intervention. Accordingly, the user convenience may be maximized.

Referring to FIG. 21B, the powerless electronic device 2101 according to various embodiments of the present disclosure may include a sensor 2110 on its rear side. The sensor 2110 may be implemented with, for example, a pressure sensor, an optical sensor or the like, and may recognize the user's biometric information such as the user's touch, electrocardiogram (ECG) signal, fingerprint, or vein image. The sensor 2110 may be implemented with an optical sensor in one embodiment, and may include a heart rate monitor (HRM) sensor, a blood pressure (BP) sensor, a glucose sensor, a temperature sensor, a vein sensor, a biomarker sensor and the like.

For example, the sensor 2110 may irradiate the light 2111 towards the user's wrist. The light 2111 may be reflected by the vein 2120, and the reflected light 2112 may be input to the sensor 2110. The sensor 2110 may recognize the shape of the vein 2120 using the received reflected light 2112. Accordingly, the powerless electronic device 2101 may obtain biometric information of the shape of the vein 2120. Meanwhile, in an embodiment of FIG. 21B, the biometric information is provided to represent the vein shape, but this is simply illustrative. There is no limit on the biometric information, if the biometric information is the information that has different characteristics for each person. For example, the biometric information may include the physical characteristics, which are different for each person, such as the shape of the fingerprints, the shape of the iris, the shape of the retina, the shape of the vein in the vicinity of the wrist, the shape of the ears, the shape of the face, the shape of the hand, and the like. As described above, the recognition based on the uniqueness of the shape can be referred to as the visual recognition, and if the biometric information is the physical characteristics that are the target of the visual recognition, there is no limit on the biometric information. Further, the biometric information may be physical information of various signals output from the user's body, such as the voice, the brain waves (or EEG) or the cardiac waveforms, and if the biometric information is the signals output from the human body, which are different for each person, there is no limit on the type of the biometric information. Moreover, the biometric information may include the information that is used in the chemical recognition, such as deoxyribonucleic acid (DNA) matching and smell. As described above, if the biometric information is the information used to recognize the user, there is no limit on the biometric information, and if the powerless electronic device 2101 is a device capable of sensing a variety of biometric information, there is no limit on the powerless electronic device. For example, if the biometric information for the visual recognition is obtained, the powerless electronic device 2101 may include a device for obtaining images, and a device for irradiating the light. Further, the powerless electronic device 2101 may include a microphone capable of sensing the voice, and electrodes capable of measuring the brain waves or the heart rate. Moreover, the powerless electronic device 2101 may include devices for use in the chemical recognition, such as a reagent control device and a chemical analysis device.

Figure 22:
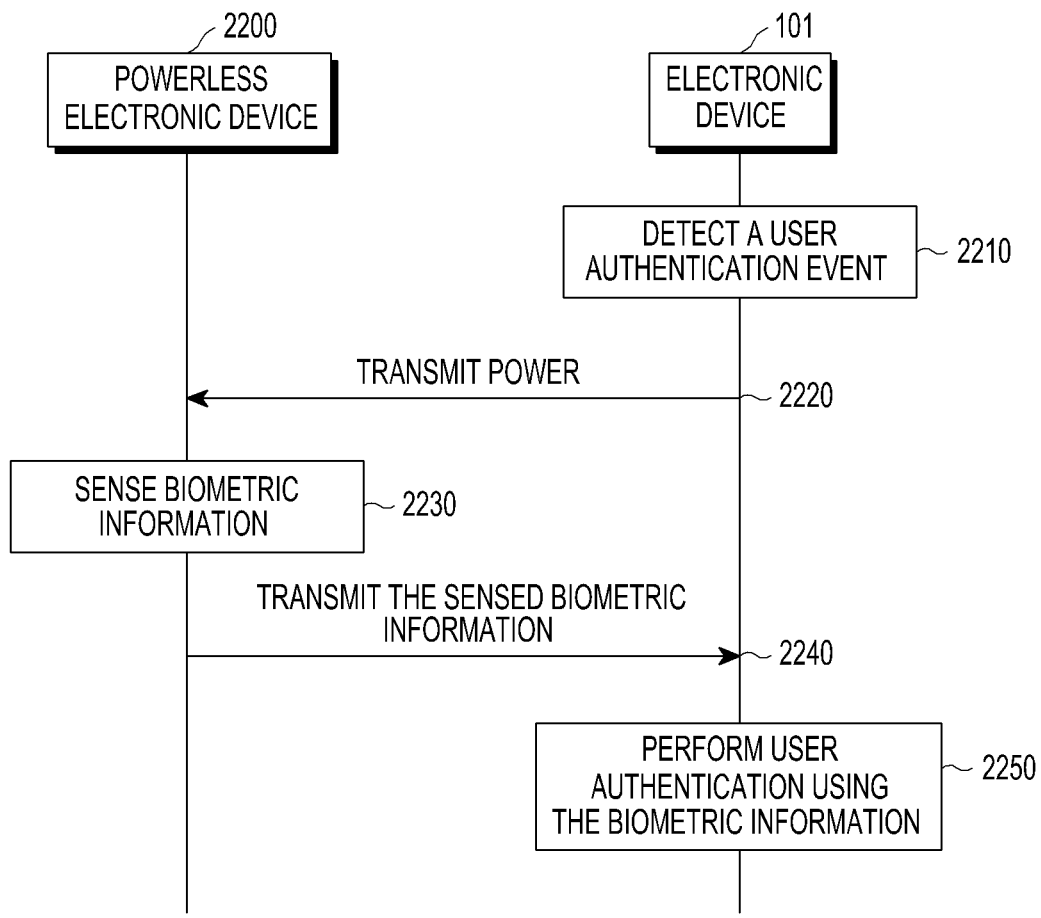
FIG. 22 is a flowchart illustrating operations of a powerless electronic device and an electronic device according to various embodiments of the present disclosure.

FIG. 22 is a flowchart illustrating operations of a powerless electronic device and an electronic device according to various embodiments of the present disclosure.

Referring to FIG. 22, in operation 2210, an electronic device 101 may detect a user authentication event. Herein, the user authentication event may refer to an event that requests user authentication. For example, receiving, by the electronic device, user authentication request from the E-commerce application may be the user authentication event.

In operation 2220, the electronic device 101 may wirelessly transmit the power to a powerless electronic device 2200. In operation 2230, the powerless electronic device 2200 may sense biometric information using the received power. In operation 2240, the powerless electronic device 2200 may transmit the sensed biometric information to the electronic device 101 using the received power. In operation 2250, the electronic device 101 may perform user authentication using the biometric information.

Figure 23:
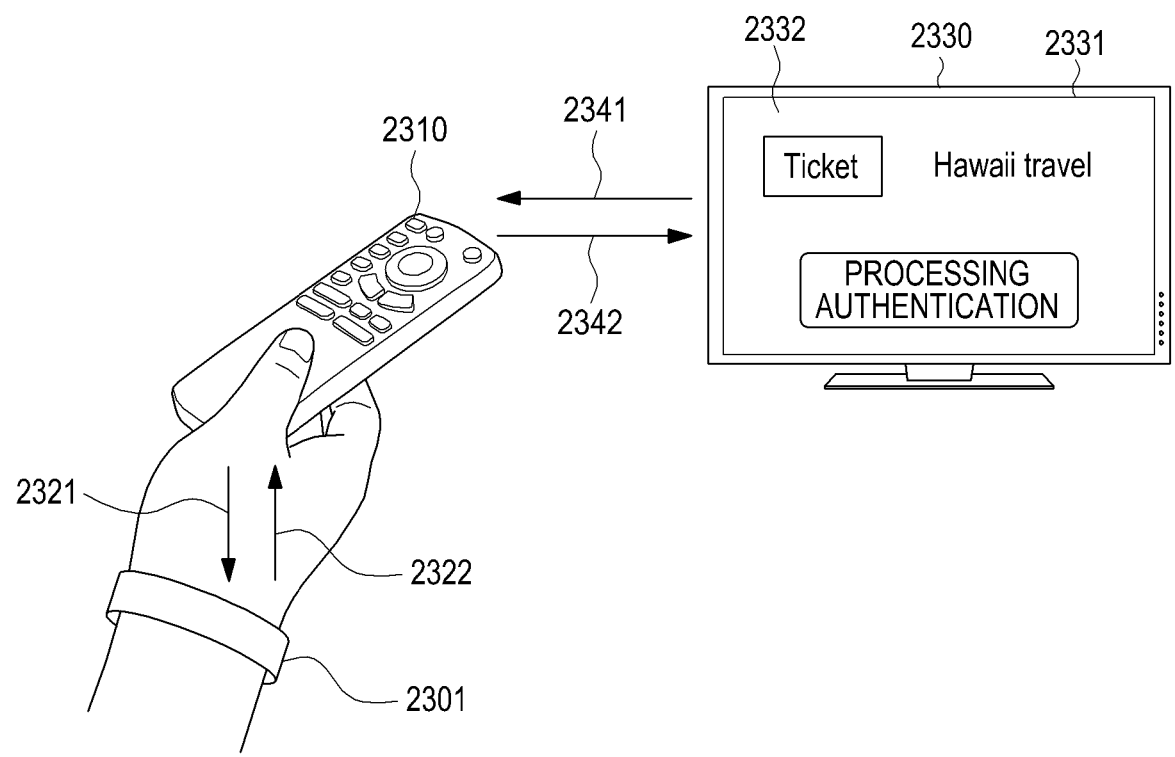
FIG. 23 is a diagram illustrating operations of a powerless electronic device and a plurality of electronic devices according to various embodiments of the present disclosure.

FIG. 23 is a diagram illustrating operations of a powerless electronic device and a plurality of electronic devices according to various embodiments of the present disclosure.

Referring to FIG. 23, a remote controller 2310 may transmit and receive signals to/from a TV 2330. For example, the remote controller 2310 may include a plurality of buttons, and if a button is selected, the remote controller 2310 may transmit a signal corresponding to the selected button to the TV 2330. Accordingly, the user may remotely control the TV 2330 by selecting a button on the remote controller 2310. Meanwhile, the TV 2330 may be an electronic device capable of Internet communication, and may run, for example, an E-commerce application. The TV 2330 may display an execution screen 2332 of the E-commerce application on a display 2331. The E-commerce application may request user authentication during purchase of a specific item or VOD content. In this case, the TV 2330 may transmit a user authentication command 2341 to the remote controller 2310. The remote controller 2310 may wirelessly transmit the power 2321 to a powerless electronic device 2301 in response to the reception of the user authentication command 2341. The powerless electronic device 2301 may sense the user's biometric information using the received power 2321. The powerless electronic device 2301 may transmit a signal 2322 including the sensed biometric information to the remote controller 2310 using the received power 2321. In another embodiment, the remote controller 2310 may wirelessly transmit the power 2321 to the powerless electronic device 2301 without any command from the TV 2330, allowing the powerless electronic device 2301 to sense the user's biometric information and transmit the sensed biometric information to the remote controller 2310.

The remote controller 2310 may extract biometric information from the received signal 2322, and transmit a signal 2342 including the extracted biometric information to the TV 2330. The TV 2330 may perform user authentication using the biometric information included in the received signal 2342. In another embodiment, the remote controller 2310 may directly perform user authentication using the biometric information included in the received signal 2322. In this case, the remote controller 2310 may transmit the signal 2342 including the user authentication result to the TV 2330. The TV 2330 may proceed with the further procedures using the user authentication result. The user authentication result may include a success/failure, or include information such as PIN. Meanwhile, the remote controller 2310 may be implemented as an electronic device capable of communication, e.g., an electronic device such as a smart phone.

The term 'module' as used herein may refer to a unit that includes, for example, one or a combination of hardware, software or firmware. The term 'module' may be interchangeably used with terms such as, for example, unit, logic, logical block, component, or circuit. The module may be the minimum unit of an integrally constructed part or a part thereof. The module may be the minimum unit for performing one or more functions, or a part thereof. The module may be implemented mechanically or electronically. For example, the module may include at least one of an application-specific integrated circuit (ASIC) chip, field-programmable gate arrays (FPGAs), or a programmable-logic device, which are known or will be developed in the future, and which perform certain operations.

At least a part of the device (e.g., modules or functions thereof) or method (e.g., operations) according to various embodiments of the present disclosure may be implemented by a command that is stored in computer-readable storage media in the form of, for example, a programming module. When the command is executed by one or more processors (e.g., the processor 120), the one or more processors may perform a function corresponding to the command. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a ROM, a random access memory (RAM) and a flash memory). The program command may include a machine code such as a code made by a compiler and a high-level language code that can be executed by the computer using an interpreter. The above-described hardware device may be configured to operate as one or more software modules to perform the operations according to various embodiments of the present disclosure, and vice versa.

A module or a programming module according to various embodiments of the present disclosure may include at least one of the above-described components, some of which may be omitted, or may further include additional other components. Operations performed by a module, a programming module or other components according to various embodiments of the present disclosure may be performed in a sequential, parallel, iterative or heuristic way. Some operations may be performed in a different order or omitted, or other operations may be added.

According to various embodiments of the present disclosure, in a storage medium storing instructions, when the instructions are executed by at least one processor, the instructions are set to allow the at least one processor to perform at least one operation. The at least one operation may include wirelessly transmitting power to a powerless sensor; and receiving data that is sensed in the powerless sensor using the wirelessly transmitted power.

As is apparent from the foregoing description, an aspect of various embodiments of the present disclosure may provide an electronic device for operating a powerless sensor through wireless power charging, and a control method thereof. When sensing and transmitting sensing data, the powerless sensor may receive wireless power from the electronic device and sense and transmit the sensing data using the received wireless power. Accordingly, the sensor is not required to have a battery therein, thereby solving the operation power problems.

Another aspect of various embodiments of the present disclosure may provide an electronic device capable of controlling a powerless electronic device. Accordingly, the powerless electronic device may operate without receiving power by wire.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a battery;
a wireless power transmitter;
a communication module;
a display; and
a processor configured to:
obtain a first command,
in response to the first command, control the wireless power transmitter to convert direct current (DC) power provided from the battery into alternating current (AC) power,
control the wireless power transmitter to wirelessly transmit the AC power to a sensor device, wherein the sensor device senses surrounding of the sensor device by using the AC power,
control the communication module to transmit a second command while wirelessly transmitting the AC power,
receive, through the communication module, a signal including information about the surrounding from the sensor device, and
control, the display to display the information about the surrounding.

2. The electronic device of claim 1, wherein the communication module is configured to receive location information of the sensor device.

3. The electronic device of claim 2, wherein the processor is further configured to:
determine a distance between the electronic device and the sensor device, and
if the distance is less than a threshold, transmit the AC power to the sensor device.

4. The electronic device of claim 2, wherein the processor is further configured to control the display to display the location information.

5. The electronic device of claim 1, wherein the communication module is configured to receive power information from the sensor device.

6. The electronic device of claim 5, wherein the processor is further configured to control a level of the AC power transmitted to the sensor device based on the received power information.

7. The electronic device of claim 1, wherein the processor is further configured to:
control the wireless power transmitter to wirelessly transmit the AC power during a first period, and
receive, through the communication module, the signal including the information about the surrounding from the sensor device after a lapse of the first period.

8. The electronic device of claim 1, further comprising:
a power reception unit configured to:
wirelessly receive power from a wireless power transmitter, and
output the received power to the battery.

9. The electronic device of claim 1, wherein the sensor device is physically implanted in a structure or a living body.

10. The electronic device of claim 1, wherein the second command is either a signal corresponding to a command for sensing biometric information or a signal corresponding to a command for sensing structure information related to a structure in which the sensor device is implanted.

11. A control method of an electronic device, the method comprising:
obtaining a first command;
in response to the first command, converting direct current (DC) power provided from a battery into alternating current (AC) power;
wirelessly transmitting the AC power to a sensor device, wherein the sensor device senses surrounding of the sensor device by using the AC power;
transmitting a second command while wirelessly transmitting the AC power;
receiving a signal including information about the surrounding from the sensor device; and
displaying the information about the surrounding.

12. The control method of claim 11, further comprising receiving location information of the sensor device.

13. The control method of claim 12, further comprising:
determining a distance between the electronic device and the sensor device, and
if the distance is less than a threshold, transmitting the AC power to the sensor device.

14. The control method of claim 13, further comprising:
if the distance is less than another threshold, displaying a user interface for control of the sensor device.

15. The control method of claim 12, further comprising displaying the location information.

16. The control method of claim 11, wherein the receiving of the signal including the information about the surrounding comprises receiving power information from the sensor device.

17. The control method of claim 16, further comprising controlling a level of the AC power transmitted to the sensor device based on the received power information.

18. The control method of claim 11, wherein the wirelessly transmitting of the AC power comprises transmitting the AC power during a first period in which a target power for performing an operation corresponding to the second command is charged.

19. The control method of claim 18, further comprising reading associated information between the second command and the target power,
wherein the wirelessly transmitting of the AC power comprises determining the target power based on the read associated information.

20. The control method of claim 11, wherein the second command is either a signal corresponding to a command for sensing biometric information or a signal corresponding to a command for sensing structure information related to a structure in which the sensor device is implanted.

* * * * *